(12) United States Patent
Nordlicht et al.

(10) Patent No.: US 7,685,054 B2
(45) Date of Patent: Mar. 23, 2010

(54) SYSTEM AND METHOD FOR REAL-TIME OPTIONS TRADING OVER A GLOBAL COMPUTER NETWORK

(76) Inventors: Mark A. Nordlicht, 165 West End Ave., New York, NY (US) 10023; Yechiel A. Zucker, 435 Central Park West, New York, NY (US) 10025

( * ) Notice: Subject to any disclaimer, the term of this patent is extended or adjusted under 35 U.S.C. 154(b) by 903 days.

(21) Appl. No.: 11/370,346

(22) Filed: Mar. 7, 2006

(65) Prior Publication Data
US 2006/0149662 A1 Jul. 6, 2006

Related U.S. Application Data

(62) Division of application No. 10/133,972, filed on Apr. 26, 2002, now abandoned.

(60) Provisional application No. 60/286,807, filed on Apr. 26, 2001.

(51) Int. Cl.
*G06Q 40/00* (2006.01)
(52) U.S. Cl. .................................................... 705/37
(58) Field of Classification Search .................. 705/37
See application file for complete search history.

(56) References Cited

U.S. PATENT DOCUMENTS

| | | | |
|---|---|---|---|
| 5,136,501 A | 8/1992 | Silverman et al. | |
| 5,168,446 A | 12/1992 | Wiseman | |
| 5,689,652 A | 11/1997 | Lupien et al. | |
| 5,845,266 A | 12/1998 | Lupien et al. | |
| 5,950,177 A | 9/1999 | Lupien et al. | |
| 5,970,479 A | 10/1999 | Shepherd | |
| 6,012,046 A | 1/2000 | Lupien et al. | |
| 6,016,483 A | 1/2000 | Rickard et al. | |
| 6,061,662 A | 5/2000 | Makivic | |
| 6,098,051 A | 8/2000 | Lupien et al. | |
| 6,134,536 A | 10/2000 | Shepherd | |
| 6,298,335 B1 | 10/2001 | Bernstein | |
| 6,381,586 B1 | 4/2002 | Glasserman et al. | |
| 6,408,282 B1 | 6/2002 | Buist | |
| 6,418,417 B1 | 7/2002 | Corby et al. | |
| 6,691,094 B1 | 2/2004 | Herschkorn | |
| 7,251,629 B1 * | 7/2007 | Marynowski et al. | 705/37 |
| 7,324,967 B1 | 1/2008 | Sankaran et al. | |
| 2001/0034689 A1 | 10/2001 | Heilman | |
| 2001/0047323 A1 | 11/2001 | Schmidt | |
| 2001/0049651 A1 | 12/2001 | Selleck | |
| 2002/0007335 A1 | 1/2002 | Millard et al. | |

(Continued)

OTHER PUBLICATIONS

Cooper et al, "The yen/dollar exchange rate in 1998: Views from options markets", Bank of England, Quarterly Bulletin, London; Feb. 1999, vol. 39, Iss. 1; p. 68.*

(Continued)

*Primary Examiner*—Hani Kazimi
*Assistant Examiner*—Olabode Akintola
(74) *Attorney, Agent, or Firm*—Darby & Darby P.C.

(57) ABSTRACT

The present invention relates to a method and system for electronically trading a financial instrument. The method includes entering a bid order for the financial instrument and placing the bid order in a bid queue associated with a buyer who maintains a list of sellers to sell the financial instrument to. Then, entering an ask order for the financial instrument and placing the ask order in an ask queue associated with a seller who maintains a list of buyers to buy the financial instrument from. Next, the present invention will match the bid order and the ask order and to execute a trade between the buyer and the seller. Lastly, the trade is executed if the bid order is not less than the ask order, and if the buyer is on the list of buyers and the seller is on the list of sellers.

14 Claims, 22 Drawing Sheets

U.S. PATENT DOCUMENTS

| | | |
|---|---|---|
| 2002/0082967 A1 | 6/2002 | Kaminsky et al. |
| 2002/0111886 A1 | 8/2002 | Chenevich et al. |
| 2002/0120555 A1 | 8/2002 | Lerner |
| 2002/0128955 A1 | 9/2002 | Brady et al. |
| 2002/0133456 A1 | 9/2002 | Lancaster et al. |
| 2002/0156719 A1 | 10/2002 | Finebaum et al. |
| 2002/0161684 A1 | 10/2002 | Whitworth |
| 2002/0194105 A1 | 12/2002 | Klein |
| 2003/0097325 A1 | 5/2003 | Friesen et al. |
| 2003/0097328 A1 | 5/2003 | Lundberg et al. |
| 2003/0101123 A1 | 5/2003 | Alvarado et al. |
| 2003/0110107 A1 | 6/2003 | Hiatt et al. |
| 2003/0154153 A1 | 8/2003 | Steidlmayer et al. |
| 2003/0208407 A1 | 11/2003 | Dawson |
| 2003/0208437 A1 | 11/2003 | Samuelson |
| 2007/0288346 A1 | 12/2007 | May |

OTHER PUBLICATIONS

Apostolou, N. G., et al., "A Risk Management Approach to Investing in Options", The CPA Journal, New York: Jun. 2000.*

Tanabe, A., "Japanese Bond Rise Amid Rumors of Mori's Departure-Traders Fear His SUccessor WOuld Cut Fiscal Spending", Asian Wall Street Journal. New York, NY.: Nov. 3, 2000.*

* cited by examiner

TRADE

| Trade Date | Type | Leg | Buy/Sell | Qty | Month | Year | Exp Date | Strike | Call/Put | Price |
|---|---|---|---|---|---|---|---|---|---|---|
| 1/1/00 | Call | 1 | Sell | 5 | May | 2000 | 4/28/00 | 425.0 | | 35.15 |
| 1/1/00 | Put | 1 | Sell | 250 | May | 2000 | 3/26/00 | 225.0 | Put | 9.25 |
| 1/1/00 | CS | 1 | Buy | 800 | Feb | 2001 | 1/28/00 | 250 | Call | .08 |
| | | 2 | Sell | 800 | Feb | 2001 | 1/28/00 | 260 | Call | |
| 1/1/00 | PS | 1 | Buy | 250 | Jan | 2002 | 12/28/01 | 270 | Put | 12.4 |
| | | 2 | Sell | 250 | Jan | 2002 | 12/28/01 | 230 | Put | |
| 1/1/00 | STRD | 1 | Sell | 1000 | Jun | 2001 | 5/28/00 | 325.1 | Put | 48.55 |
| | | 2 | Sell | 1000 | Jun | 2001 | 5/28/00 | 325.1 | Call | |
| 1/1/00 | STRN | 1 | Sell | 25 | Oct | 2001 | 9/22/01 | 200 | Put | 3.2 |
| | | 2 | Sell | 25 | Oct | 2001 | 9/22/01 | 200 | Call | |
| 1/1/00 | FEN | 1 | Buy | 100 | June | 2000 | 5/28/00 | 200 | Put | 0.2 |
| | | 2 | Sell | 100 | June | 2000 | 5/28/00 | 300 | Call | |
| 1/1/00 | STRDs | 1 | Buy | 10 | Sep | 2000 | 8/28/00 | 275 | Put | 0.4 |
| | | 2 | Buy | 10 | Sep | 2000 | 8/28/00 | 275 | Call | |
| | | 3 | Sell | 10 | Oct | 2000 | 8/28/00 | 300 | Put | |
| | | 4 | Sell | 10 | Oct | 2000 | 8/28/00 | 300 | Call | |
| 1/1/00 | cSTP | 1 | Sell | 20 | Mar | 2001 | 2/25/01 | 260 | Call | 9.0 |
| | | 2 | Sell | 20 | Apr | 2001 | 3/26/01 | 260 | Call | 9.0 |
| | | 3 | Sell | 20 | May | 2001 | 4/25/01 | 260 | Call | 9.0 |
| | | 4 | Sell | 20 | Jun | 2001 | 5/27/01 | 260 | Call | 9.0 |
| | | 5 | Sell | 20 | Jul | 2001 | 6/24/01 | 260 | Call | 9.0 |

Figure 7A

HEDGE

| Premium | Time | Trade ID | Buy/Sell | Delta | Qty | Month | Price |
|---|---|---|---|---|---|---|---|
| x | 10:31:22 | | Sell | 0:20 | 50 | May | 2.55 |
| x | | | Buy | 0.25 | 63 | Jan | 275 |
| x | | | Buy | 0.20 | 4 | Mar | 255 |
| x | | | Buy | 0.25 | 5 | Apr | 250 |
| x | | | Buy | 0.30 | 6 | May | 260 |
| | | | Buy | 0.26 | 5 | Jun | 263 |
| | | | Buy | 0.35 | 7 | Jul | 270 |

Figure 7B

| | | | | | | | | |
|---|---|---|---|---|---|---|---|---|
| pSTP | 1 | Buy | 3 | Nov | 2000 | 10/28/00 | 420 | Put | 7.5 |
| | 2 | Buy | 3 | Dec | 2000 | 11/28/00 | 420 | Put | 7.5 |
| 1/1/00 | 3 | Buy | 3 | Jan | 2001 | 12/28/00 | 420 | Put | 7.5 |
| | 4 | Buy | 3 | Feb | 2001 | 1/28/01 | 420 | Put | 7.5 |
| strdSTP | 1 | Sell | 46 | Mar | 2000 | 2/28/00 | 250 | Put | 49 |
| | 2 | Sell | 46 | Mar | 2000 | 3/28/00 | 250 | Call | |
| | 3 | Sell | 46 | Apr | 2000 | 4/28/00 | 260 | Put | 49 |
| 1/1/00 | 4 | Sell | 46 | Apr | 2000 | 5/28/00 | 260 | Call | |
| | 5 | Sell | 46 | May | 2000 | 6/28/00 | 270 | Put | 49 |
| | 6 | Sell | 46 | May | 2000 | 7/28/00 | 270 | Call | |
| strnSTP | 1 | Buy | 100 | Jan | 2001 | 12/28/00 | 220 | Put | 11.4 |
| | 2 | Buy | 100 | Jan | 2001 | 12/28/00 | 300 | Call | |
| 1/1/00 | 3 | Buy | 100 | Feb | 2001 | 1/28/01 | 220 | Put | 11.4 |
| | 4 | Buy | 100 | Feb | 2001 | 1/28/01 | 300 | Call | |
| fenSTP | 1 | Buy | 250 | Apr | 2000 | 3/28/00 | 210 | Put | 5.5 |
| | 2 | Sell | 250 | Apr | 2000 | 3/28/00 | 280 | Call | |
| | 3 | Buy | 250 | May | 2000 | 4/28/00 | 210 | Put | 5.5 |
| 1/1/00 | 4 | Sell | 250 | May | 2000 | 4/28/00 | 280 | Call | |
| | 5 | Buy | 250 | Jun | 2000 | 5/28/00 | 210 | Put | 5.5 |
| | 6 | Sell | 250 | Jun | 2000 | 5/28/00 | 280 | Call | |

Figure 7C

|       |   | E G |     |     |           |       |      |
|-------|---|-----|-----|-----|-----------|-------|------|
| CFLY  | 1 | Buy | 100 | Jan | 2001 | 12/28/00 | 250.0 | Call | 1.2 |
|       | 2 | Sell | 200 | Jan | 2001 | 12/28/00 | 260.0 | Call |  |
|       | 3 | Buy | 100 | Jan | 2001 | 12/28/00 | 270.0 | Call |  |
| IFLY  | 1 | Sell | 500 | May | 2001 | 4/28/01 | 300 | Put | 25.1 |
|       | 2 | Buy | 500 | May | 2001 | 4/28/01 | 310 | Put |  |
|       | 3 | Buy | 500 | May | 2001 | 4/28/01 | 310 | Call |  |
|       | 4 | Sell | 500 | May | 2001 | 4/28/01 | 320 | Call |  |
| 3Way  | 1 | Sell | 50 | Oct | 2005 | 09/28/05 | 250 | Call | 1.2 |
|       | 2 | Buy | 50 | Oct | 2005 | 09/28/05 | 200 | Put |  |
|       | 3 | Buy | 50 | Oct | 2005 | 09/28/05 | 300 | Call |  |
| IWaySTI | 1 | Sell | 200 | Sep | 2000 | 8/28/00 | 275 | Call | 6.2 |
|       | 2 | Buy | 200 | Sep | 2000 | 8/28/00 | 225 | Put |  |
|       | 3 | Buy | 200 | Sep | 2000 | 8/28/00 | 300 | Call |  |
|       | 4 | Sell | 200 | Oct | 2000 | 9/28/00 | 275 | Call | 6.2 |
|       | 5 | Buy | 200 | Oct | 2000 | 9/28/00 | 225 | Put |  |
|       | 6 | Buy | 200 | Oct | 2000 | 9/28/00 | 300 | Call |  |
|       | 7 | Sell | 200 | Nov | 2000 | 10/28/00 | 275 | Call | 6.2 |
|       | 8 | Buy | 200 | Nov | 2000 | 10/28/00 | 225 | Put |  |
|       | 9 | Buy | 200 | Nov | 2000 | 10/28/00 | 300 | Call |  |

Figure 7E

|  |  |  |  |  |  |  |  |  |
|---|---|---|---|---|---|---|---|---|
| pTRE | 1 | Sell | 23 | Dec | 2001 | 11/28/01 | 290 | Put | 0.4 |
|  | 2 | Buy | 23 | Dec | 2001 | 11/28/01 | 260 | Put |  |
|  | 3 | Buy | 23 | Dec | 2001 | 11/28/01 | 240 | Put |  |
| pCDR | 1 | Sell | 100 | Feb | 2001 | 1/28/01 | 290 | Put | 3.4 |
|  | 2 | Buy | 100 | Feb | 2001 | 1/28/01 | 280 | Put |  |
|  | 3 | Buy | 100 | Feb | 2001 | 1/28/01 | 270 | Put |  |
|  | 4 | Sell | 100 | Feb | 2001 | 1/28/01 | 260 | Put |  |
| rCS | 1 | Buy | 200 | Jan | 2000 | 12/28/00 | 250 | Call | 9.65 |
|  | 2 | Sell | 300 | Feb | 2000 | 12/28/00 | 280 | Call |  |
| rPS | 1 | Sell | 500 | Dec | 2010 | 11/28/09 | 275 | Put | 0 |
|  | 2 | Buy | 1000 | Dec | 2010 | 11/28/09 | 250 | Put |  |
| rFen | 1 | Buy | 200 | Nov | 2008 | 10/28/06 | 200 | Put | 12.6 |

Figure 7G

| Contract Name | OFL Code1 | OFL Code2 | OFL Code3 | CSL Display Code |
|---|---|---|---|---|
| Call | C | Call | Calls | Call |
| Put | P | Put | Puts | Put |
| Call Spread | CS | | | CS |
| Put Spread | PS | | | PS |
| Straddle | STRD | | | STRD |
| Strangle | STRN | | | STRN |
| Fence | FEN | | | FEN |
| Straddle Spread | STDS | STRDs | | STRDs |
| Call Strip | STP | CSTP | | Cstp |
| Put Strip | STP | PSTP | | Pstp |
| Straddle Strip 1 | strdSTP | | | strdSTP |
| Straddle Strip 2 | strdSTP | | | strdSTP |
| Strangle Strip | strdSTP | | | strdSTP |
| Fence Strip | FSTP | | | Fstp |
| Butterfly (Call & Put) | Fly | cFLY | pFLY | xFLY |
| Iron Butterly (Call & Put) | iFLY | | | IFLY |
| Three Way | 3Way | | | 3Way |
| Three Way Strip | 3Way STP | | | 3WaySTP |
| Christmas Tree | TRE | cTRE | pTRE | xTRE |

Figure 8A

| OEL | OEL DISPLAY | | | | vol |
|---|---|---|---|---|---|
| B 100 May 255.5 C12 | Call May 255.5 | 100 | | | |
| S 50 Jul02 235 P 1:2 | Put Jul02 235 | | | | 60 |
| B 100 Jun 250/260 C8 2.65 | CS Jun 250/Jun 260 | 100 | | | |
| B 100 Jun 250/260.5 PS 3.5 | CS Jun 250/260.5 | 100 | | | |
| S 1000 May 250 STRD 68.55 | STRD May 250 | | | | 1000 |
| S 100 May 250p/300c STRN 9.6 | STRN May 250p/300c | | | | 100 |
| B 30 Jun 250p/300c + FEN 28.2 | FEN Jun250p/300c | 30 | | | |
| B 100 May 250/May 260 STRDS 54.5 | STDs May 250p May 260 | 100 | | | |
| B 300 Nov00/Jul01 250 eSTP 12.2 | cSTP Nov/Jul01 250 | 300 | | | |
| S 100 May/Oct 220 PSTP 8.6 | pSTP May/Oct 220 | | | | 100 |
| S 10 Jan/Oct 280 strdSTP 6.8 | strdSTP Jan/Oct | 10 | | | |
| B 10 Jun/Oct 280 strnSTP 6.8 | strdSTP Jan/Oct 260 | 10 | | | |
| B 50 Mar/Nov 230p/310c simSTP 3.2 | strnSTP Mar/Nov 230p/310c | 50 | | | |
| S 25 Jun/Dec 200p/300c ISTP.8 | ISTP June/Dec 200p/300c | | | | 25 |
| B 50 Sept 250/260/270 IFLY 2.35 | cFLY Sep 250/260/270 | | | | 50 |
| B 10 Jan 220/260/280 IFLY 2.35 | IFLY Jan 220/260/280 | | | | 10 |
| B 25 May 200p/200c/2500 3Way 2.0 | 3Way May 200/200/200 | 25 | | | |
| B 50 May/Sep 200p/250/200c 3WaySTP | 3WaySTR May/Sep 220p/290c/260c | 50 | | | |

Figure 8B

| | CDR | cCDR | pCDR | xCDR |
|---|---|---|---|---|
| Condor | | | | |
| Eagle Call Spread | IPS | | | rCS |
| Ratio Put Spread | FEN | | | rPS |
| Ratio Fence | | | | rFEN |
| | | | | |
| | | | | |
| | | | | |
| Hedged Call | C | Call | | Call |
| HPS | PS | | | PS |
| H Butterfly | FLY | eFLY | pFLY | xFLY |
| H Call Strip | STP | eSTP | | cSTP |
| Custom | Cust | | | CUST |
| CUST Continued | | | | |
| Action Codes – QEL | | | | |

Figure 8C

| | | |
|---|---|---|
| B 100 Oct 220/265 OTRE 0.5 | cTRE Oct 220/260/265 | 100 |
| B 50 Dec 220/ /250 CDR 10.15 | rCDR Dec 220/230/240/250 | 20 |
| B 200 Jul 250/265 1x2 CS 2.5 | rCS Jul 250/285 1x2 | 200 |
| B 150 Sep 210/230 1x3 PS 8.3 | IPS Sep 210/260 1x3 | 150 |
| B 100 Mar 220p/290c 1x2 rFEN 3.6 | IFEN Mar 200p/280 1x2 | 100 |
| | | |
| B 100 May 255.5 C 12.5 Vs 275 32D | H Call May 255.5 Vs 275.0 32D | 100 |
| B 100 Jun 250/260.5 PS 2.65 vs 270.5 | H PS Jun 250.0/260.5 Vs 270.5 12D | 100 |
| S 50 Sep 250/260/270 CFLY 2.5 VS 265 | H cFLY Sep 250/260/270 Vs 265 10D | 50 |
| B 300 Nov00/Jul 01 250 cSTP 12.2 Vs | H cSTP nov/Jul01 250 Vs 275.5 48D | 300 |
| B 22 May 220p B 13 May 225p S 8 May | 1 Cust May 220p/May 225p/bIay 240pbIay 26.5p | 1 |
| S 68 May 265p+ 1.2 | 22x 13x8\68 | |
| | | |
| | | |

Figure 8D

| Action | OEL Code 1 | OEL 2 | CSL Display | OEL Example |
|---|---|---|---|---|
| Quote | Q | | N/A | Q Oct 300 call |
| Request for Quote | RFQ | | RFQ | RFQ May 255 Call |
| View Market (single option) | V | VM | N/A | V Mar 255 C |
| View Market (Month) | V | VM | N/A | V Mar |
| View Market (straddle) | V | VM | N/A | VM Std |
| Buy | s | VM | | B 100 Mar 255 C |
| Sell | s | Buy | | S 10 May 300P |
| Set Premium | "strike" + | Sell | | May 220p+/300c Fen |
| Hedge | Vs | | Underlined | B 10 Jan 225 P 2.5 Vs 240.0 32D |
| Delta | D | | Vs | See hedged example |
| Fill or Kill | FCK | | 25D | S 10 May 300C 4.5 FOK |
| Good Till Cancelled | GTC | | N/A | S 10 May 300C 4.5 GTC |
| Fly | Fly | | cFLY,pFLY | fly |
| Cust | Cust | | Cust | Cust |
| Time & sales | Time | | Time | |
| History | Hist | | Hist | |

Figure 8E

| | OEL Result | | | | | | |
|---|---|---|---|---|---|---|---|
| | Opens a Quote OEC with month and strike filled out | | | | | | |
| | | | | | | | |
| | OEL Result | | | | | | |
| | Opens a Quote OEC with month and strike filled out | | | | | | |
| | Opens a RFQ OEC card with month & strike filled out | | | | | | |
| | Opens the ESL(MDM) for the march 255 call | | | | | | |
| | Opens a "View Market" window displaying all march activity | | | | | | |
| | Opens a "View Market" window displaying all straddle activity | | | | | | |
| | Opens a Buy OEC with appropriate fields filled out | | | | | 50 | |
| | Opens a Sell OEC | | | | | | |
| | May 220p/300c FEN | | | | | | |
| | Opens a Buy OEC with delta, future price, and total futures fields filled out | | | | | | |
| | See Hedged example | | | | | | |
| | Opens OEC with FOK in the the Time field. | | | | | | |
| | Opens OEC withGTC in the Time field. | | | | | | |
| | Opens a fly OEC | | | | | | |
| | Opens a Cust OEC | | | | | | |
| | Opens a Time/Sales window | | | | | | |
| | Opens a History window | | | | | | |

△ 150.00 H: Buy 14998.5000   Price:

Default: If you enter data in Delta field it is yellow and computes the hedge quantity.

Bid  Ask  Qty  Fill

Submit   Close

Please provide a delta for this hedge

Call - Hedged

| Buy 9999 | Mon | Year | strike | Call Day | H ☑ |

Figure 10B

△ 150.00 H: Buy 14998.5000   Price:

If you enter the Hedge Quantity it will compute the Delta.

Bid  Ask  Qty  Fill

Submit   Close

Please provide a delta for this hedge

Call - Hedged

| Buy 9999 | Mon | Year | strike | Call Day | H ☑ |

SYSTEM AND METHOD FOR REAL-TIME OPTIONS TRADING OVER A GLOBAL COMPUTER NETWORK

RELATED APPLICATIONS

This application is a divisional of U.S. patent application Ser. No. 10/133,972 filed Apr. 26, 2002 which claims the benefit of U.S. Provisional Application Ser. No. 60/286,807, filed Apr. 26, 2001 The content of the applications are incorporated herein by reference, in their entirety.

FIELD OF THE INVENTION

The present invention relates to online systems and methods and, more particularly, to systems and methods that facilitate real-time options trading over a computer network, such as the Internet.

BACKGROUND OF THE INVENTION

Options are legally binding agreements that grant the holder the right, but not the obligation, to buy or sell a financial instruments (i.e. commodities like crude oil, cotton, and wheat) on a particular date some time in the future at a set price. Options contracts generally have standard quality, quantity, delivery time and location depending upon the type of underlying commodity associated with them. The only "negotiated" variable is price (or "premium"), which has traditionally been discovered on the floors of futures exchanges, such as the Chicago Board of Trade through the open outcry auction market system. This process allows buyers and sellers to consummate trades by offering verbal bids and offers.

Certain terminology is essential in the field of option trading. A CALL is the right, but not the obligation to buy, for instance, an underlying commodity at a specific price (strike price) up until a specific time in the future (expiration date). A PUT is the right but not the obligation to sell the underlying commodity at a specific price up until a specific point in the future. A CALL SPREAD is when you simultaneously buy one call and sell another. An example would be the simultaneous buying of a May 50 call and selling of a May 55 call. If they were in different months it would be a known as CALENDAR CALL. This is a spread which would be the simultaneous buying of a May 50 call and selling of a July 50 call. A STRADDLE is the simultaneous buying of a call and a put of the same strike in the same month. So one would be buying say, a 50 call and buying the 50 put. Another trade type is a FENCE, which would be the simultaneous buying of a put and selling a call (or selling the put and buying the call). If one executes these trades in different months it is a "calendar" fence. Many option trades are carried out by combining multiple calls or puts in various different combinations (such "multi-leg"). Other trading types have colorful names such as butterflies, strangles, calendar spreads, Christmas trees, condors, iron butterflies, etc. each involving different trading strategies. For instance, a BUTTERFLY is the sale (purchase) of two options with the same strike price, together with the purchase (sale) of one option with a lower strike price and one option with a higher strike price. All options must be of the same type (call or put), have the same expiration date and, there must be an equal increment between strike prices. Some types of options trades and strategies could have even say 12 legs. Every trade or option strategy is just a combination of calls and puts and one must have an understanding of each option type—its pattern and how many legs it would have.

The open outcry system allows for quick assimilation of market information where buyers counterbalance sellers and ultimately arrive at a fair market value for the contracts. However, the open outcry system does not always provide for price transparency—making it difficult for some consumers to directly participate in the process. Furthermore, as the volume and volatility of the futures market continues to increase, it is becoming more difficult to handle the administrative challenges presented by the open-outcry system. For these reasons, among others, there is a need for a different approach to options trading.

One potential solution is the use of an electronic order entry system. However, unlike open-outcry, traders in a computerized setting cannot "see" the market participants; "feel" the interest in a particular instrument. Thus, there is a need for an electronic order system that provides human market participants with the feel of an exchange floor with the convenience of computerized organization.

SUMMARY OF THE INVENTION

The present invention relates to a method and system for electronically trading a financial instrument. The method includes entering a bid order for the financial instrument and placing the bid order in a bid queue associated with a buyer who maintains a list of sellers to sell the financial instrument to. Then, entering an ask order for the financial instrument and placing the ask order in an ask queue associated with a seller who maintains a list of buyers to buy the financial instrument from. Next, the present invention will match the bid order and the ask order and to execute a trade between the buyer and the seller. Lastly, the trade is executed if the bid order is not less than the ask order, and if the buyer is on the list of buyers and the seller is on the list of sellers.

A further method and system of the present invention relate to electronically trading options contracts and hedging the options contracts with futures contracts. The method includes entering a buy order for options with a first hedge delta to represent a first number of futures. A sell order is entered for options with a second hedge delta that represents a second number of futures. Then the buy order and the sell order are matched so a trade can be executed. Lastly, the trade is executed if the first hedge delta matches the second hedge delta.

Another embodiment of the present invention is a system and method for real-time options trading over a global computer network, such as the Internet. In particular, the present invention discloses a system for real-time trading of options contracts between a plurality of traders over a computer network. The system includes a computer network, a market server, and two or more trader clients.

The market server is connected to the computer network. The market server additionally processes and executes matched trade orders in substantially real time. The market server may also preclude execution of a trade based on credit available to the human trader.

The two or more trader clients are connected to the computer network so each of the trader clients can be placed into communication with the market server. Each of the trader clients facilitates enters and transmits commands in substantially real-time to the market server and displays substantially real-time updates from the market server. Each of the trader clients further provides information to the human trader regarding a desired underlying commodity market as received from the market server. Each trader client may then display the underlying commodity information in a working order and filled order windows. The underlying commodity information is alternatively available to the human trader in both summary and detailed form.

The trader client's commands may include trade orders wherein the market server distributes the trade orders and any executions of same to each of the trader clients in substantially real-time. Each trader client facilitates the entry of commands by providing a graphical user interface. The trader client may also facilitate the entry of the commands by providing a simplified order entry language.

A further embodiment of the present invention discloses a method for real-time trading of options contracts between multiple traders on an underlying commodity over a computer network using a client-server system having multiple clients. The method includes submitting commands to the server, acting upon the commands submitted from multiple clients at the server, and displaying all information from the server regarding the submitted commands. Traders enter the commands that are submitted to the server. The commands entered are issued from multiple clients in regard to the underlying commodity. Providing multiple command entry methods may facilitate the submission of the commands. One such entry method involves using graphical user interface principles. Another such entry method involves a quick entry language.

Acting upon the commands submitted includes matching trade order commands of at least two traders according to a set of rules in substantially real-time. Acting upon the commands further includes validating commands prior to acting further on the command.

Information from the server regarding submitted commands related to the underlying commodity and resulting server actions is displayed in substantially real-time on all of the multiple clients. The display further includes parsing the information into multiple windows depending upon the status of the order.

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 8 illustrates a non-exclusive list of Quick Entry language command syntax;

FIG. 10A illustrates a potential order entry dialog box embodiment of the trader client; and FIG. 10B illustrates another embodiment of an order entry dialog box that may be used in the trade client.

DETAILED DESCRIPTION OF THE PREFERRED EMBODIMENT

Figure 1:
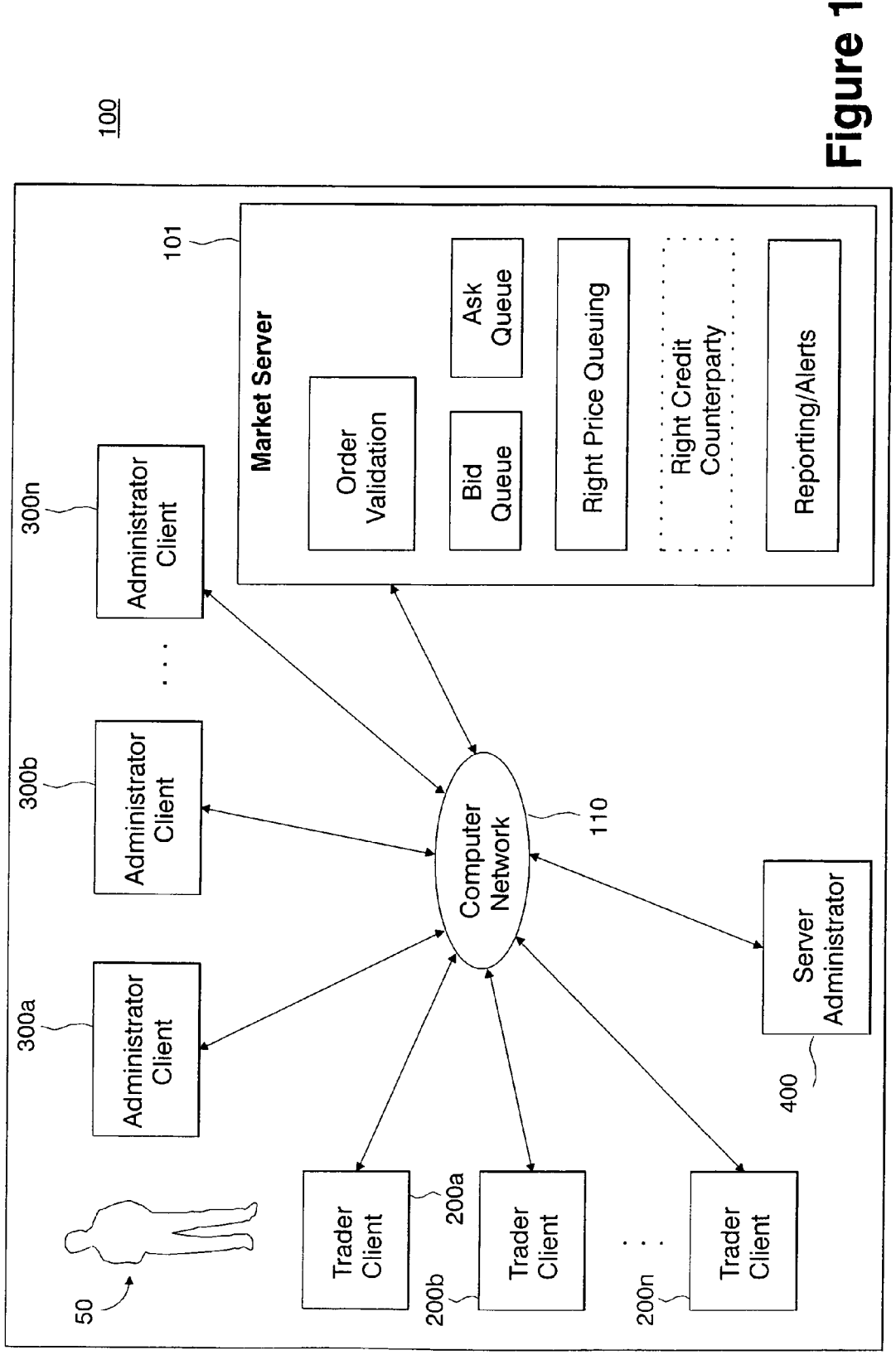
FIG. 1 is a block diagram overview of the various components of the present invention.

FIG. 1 is a block diagram overview of the various components of the present inventive system. In particular, system 100 includes market server 101, trader clients 200a-n, administrator clients 300a-n, and a server administrator 400. It is critical to the present system that at least market server 101 and each of trader clients 200a-n are able to communicate in real-time.

As illustrated in FIG. 1, each of trader clients 200a-n, administrator clients 300a-n and server administrator 400 are connected to market server 101 via computer network 110. Computer network 110 is any computer network that allows multiple computer systems to communicate with each other such as a Local Area Network (LAN), a Wide Area Network (WAN), an intranet or the Internet using standard communications protocols. It should also be noted that computer network 110 could comprise the public telephone network with market server 101 acting as a dial-up bulletin board and the trader clients 200 dialing in directly to market server 101 via a telephone network. Each trader client 200 can be connected to market server 101 using any of the foregoing types of networking approaches and none need to connect via the same networking approach.

Trader clients 200a-n each preferably run on a general-purpose computer system such as an IBM compatible, Apple, or other equivalent personal computer that allows a potential trader to communicate with market server 101 via computer network 110. The general-purpose computer system further includes a network interface that allows for communications with the computer network and may include any Internet capable software program such as Netscape© Navigator©, Microsoft© Internet Explorer©, Mosaic©, or their equivalents.

The market server 101 is preferably a general-purpose computer system such as an IBM© compatible, Apple©, Unix type workstation, or their equivalents that can facilitate inquiries from multiple simultaneous inquiries. Market server 101 must also have a network interface that allows for communications with the computer network and may include Internet server software. It is known in the art that the market server 101 and trader clients 200a-n need not be running on the same type of general-purpose computer for the present system to be operational.

Once the trader client 200 is connected to the market server 101, users will access various user interfaces, which may take the general form depicted in FIGS. 2 through 7. These figures suggest the use of Java applets in a Microsoft© Windows© environment but it is apparent to those skilled in the art that numerous other environments can be used. Other programming languages and user-interface approaches may also be used to facilitate data entry and execute the various computer programs that make up the present invention.

Market server 101 is the focal point and final arbiter for order processing and trade execution with respect to sequencing and timing. In particular, market server 101 should:

Accept, process, store and distribute "Request for Quotes" ("RFQs"), quotes, orders, executions, confirmations, and rejections and other system messages in real-time;

Maintain a repository of market participant information (users, traders, administrators);

Screen trades based on party identity;

Maintain message and activity logs suitable for history and to support billing purposes;

Facilitate instant messaging from market server 101 to trader client 200 users for system status and system announcements;

Provide price transparency by distributing all quotes and orders in a particular Underlying market (e.g. natural gas, cotton, gold, stocks); and Provide settlement support including reporting of firm wide and per user activity on the system to allow easy integration with each firm's settlement systems.

The market server 101 may also provide:

Limited anonymity (market participants may choose not to identify themselves to other participants before the trade, and need only reveal their identities to counterparties after the trade);

Credit Facility interface (trades may be approved in real-time by third-party guarantors);

Distribution of market updates through e-mail, fax and pager;

Trade screening based available credit and firm-assigned risk; and

Cash settlement facilities.

Market server 101 includes a user entitlements handler that maps user IDs associated with incoming messages and other service requests with the stored security permission information related to the user type of the user making the request in order to authenticate users to the market server, and toward checking whether the user ID is entitled to perform the requested operation.

The market server 101 further includes an order matching handler for reviewing all currently active orders and quotes, executing any trades possible according to pre-programmed matching rules, modifying orders and quotes according to the matching rules, and providing confirmation to all traders effected by the resulting trades. In particular, a trade will occur when the "Right Price Queuing" rule is satisfied. In a preferred embodiment, a trade will not occur unless the "Right Counterparty Rules" is simultaneously satisfied.

Financial instruments can only be traded among themselves; they cannot trade with another instrument that differs from them in any detail, except that hedged instruments need only match on the net delta. To facilitate these trades, each instrument has a bid queue consisting of bids and an ask queue consisting of asks. Thus, when a bid on a particular instrument reaches the market server 101, it is placed in the bid queue for that instrument after execution of any pending trades. The placement of the instrument is based on a number of factors. Some factors may include the price, a better price move further forward in the queue, and time, earlier bids stay ahead of later bids of the same price. As a result, the best bid, which may be the highest bid, is placed on the front of the bid queue. Likewise, when an ask on a particular instrument reaches the market server 101, it is placed in the ask queue for that instrument. Again, the placement of instrument is based on a number of factors. The placement factors may include the best ask, which is the lowest offer, being placed at the front of the ask queue.

A bid or ask order may remain in its queue until a certain event is satisfied. Those events may include the order being:

a. traded in the market server 101;
b. killed by submitting trader;
c. modified by a trader (subject to certain exceptions described below); or
d. removed by the system either because of an administrative activity or because the order has timed out.

Preferably, a quote lives in the queue like a market order, except that it removes itself from the queue after a fixed time limit. This time limit may be short, approximately 10 seconds or may be lengthened or decreased. A key factor in determining the time limit is that the longer the quote is maintained in the queue, the more likely it will be stale.

The order may traded when Best Bid>=Best Ask, which may satisfy the Right Price Queuing Rule, with the trade price being the best ask. The number of contracts that trade as a result of a match is the lower of the best bid size and the best ask size. Consequently, if the best bid size and the best ask size are different, the lower of the two will be completely filled, and the higher of then two will be "partially filled" with a remainder. If a partially filled trade of instruments involving Hedged Contracts would result in a fractional hedged quantity being traded, then the orders may not match. In certain instances, the system may still match the trade if the deltas match. This may result in the generation and submission, to the market, of partial fills with alternate delta mixes in order to achieve the desired result. Every time the best bid or best ask changes which may be represented by a change in the order at the front of the bid or ask queue, the System verifies if it can execute the trade, and will keep trading until best bid<best ask. The number of contracts that have been traded is reported to all counterparties.

In one embodiment, each Firm F in market server 101 has a Counterparty List (CL) that consists of other Firms F1, F2, . . . Fn that firm F may accept as potential counterparties to a trade. Thus, each market bid in the bid queues is associated with the submitting trader 50 and the submitting trader's Firm. Then, the market server may compare both the best bid/best ask and the Firm for any one offer. Even if the Right Price Queuing Rule indicates that two orders should trade, each party must also be in the other's Counterparty List. So, if the best bid firm does not have the best ask firm in its counterparty list or the best ask firm does not have the best bid firm in its counterparty list, the trade will not execute. This is known as the "Right Credit Counterparty Rule." The fact that the trade could not be executed is then communicated to both the buyer and seller by an electronic message. The market server 101 will then continue past that unexecutable bid-ask match to the next order in the respective queue and attempt to satisfy the Right Price Queuing Rule and then again try and satisfy the Right Credit Counterparty Rule. No orders are removed from the queues for failure to satisfy some firm's right credit counterparty rule.

Market server 101 will validate all messages sent by traders to the market server 101 before being placed in either queue. Messages that do not pass validation are rejected, and a rejection message is sent back to the trader client 200 of the sending user. The trader client 200, in addition to the validation performed by the order validation service at the market server 101, also performs some validation. This double validation is desirable to provide both timely feedback to the user during the order entry process, and to provide an independent and reliable back-end service. This and other validation or screening processes can be performed electronically to both buyers and sellers. Thus, a party can have pre-set rules to electronically validate a counterparty, and if that criteria is met, the counterparty is added to the acceptable list of buyers/sellers.

Trader client 200 provides a computer interface for a human trader 50 to enter and transmit commands (i.e. RFQs, quotes, orders) to market server 101; receive and display updates from market server 101; and to submit information inquiries regarding the past and current state of the market, all in substantially real-time. In one approach, trader client 200 allows trader 50 to customize screen layouts, and automatically restores the most recent screen layout upon login. A sample layout is illustrated in FIG. 2.

In a preferred approach to the system 100, a login includes selection of a particular underlying market for the present trading session. With this approach, a trader 50 could enter the market for natural gas or precious metals. In such an approach, the trader 50 would be required to exit one underlying market to enter another underlying market. Other approaches may include the ability for multiple instruments to be traded in one session.

After a successful login, a series of information windows appear. One potential configuration is illustrated in FIG. 2. This configuration may be configured by human trader 50 from a standard configuration to any configuration of the human trader's preference. As would be understood by those of ordinary skill in the art, the number of windows that can be simultaneously displayed is limited by physical screen size and readability of the contained text. As is also known, windows may be tiled, cascaded and hidden behind other windows and later brought into view by standard operating system techniques.

Figure 2:
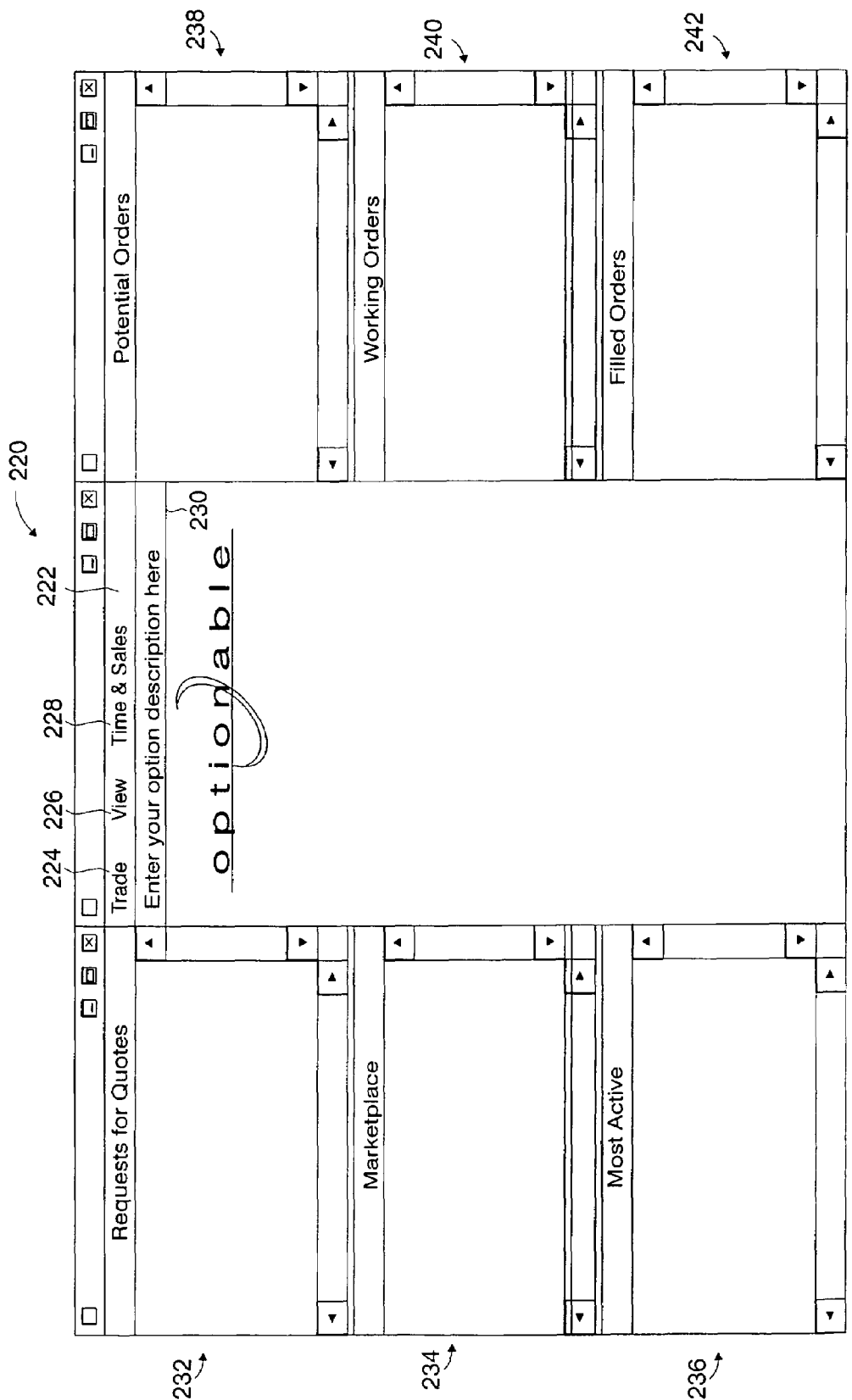
FIG. 2 illustrates a potential configuration of information windows in a graphical user interface in accordance with one potential embodiment of trader client.

As illustrated in FIG. 2, the information windows can include main application screen 220, which has a menu bar 222 containing at least "trade," 224 "view" 226 and "time & sales" 228 menus. Other commands may also be provided on the menu bar, such as a pull-down "help" menu to provide on-line documentation and information regarding system 100 and trader client 200, and options to print the data in the currently active window, exit trader client 200 and set workstation customization options (e.g. displayed windows, prompt messaging activation and reception of alert messages).

The approach illustrated in FIG. 2, the trader client 200 may have a "trade" pull-down menu 224 provided to facilitate quick creation of various options contract types. These types may include, but not limited to the most commonly used types (e.g. calls, puts, call spreads, put spreads, fences, strangles or straddle)).

Figure 3:
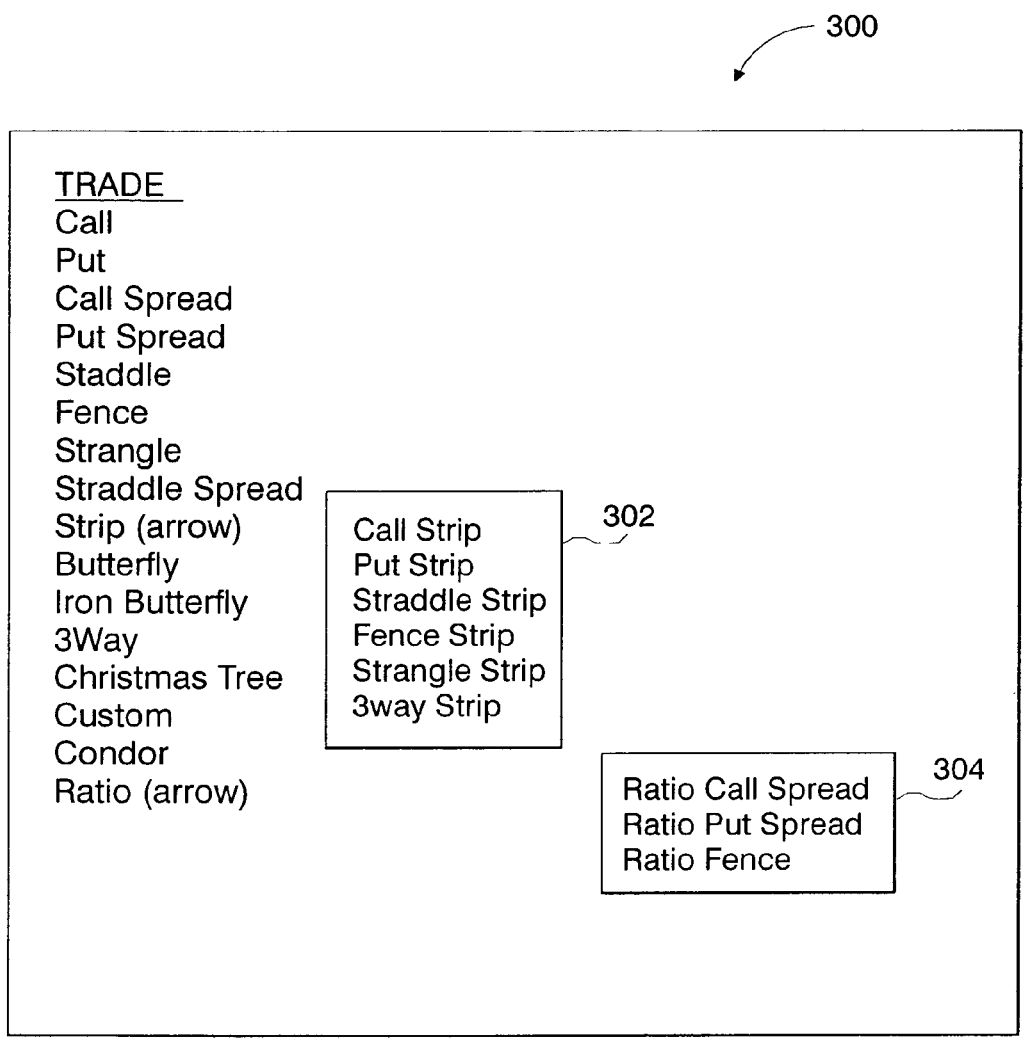
FIG. 3 illustrates a potential "trade" pull-down menu that may be used in the main application screen of trader client.
Figure 4:
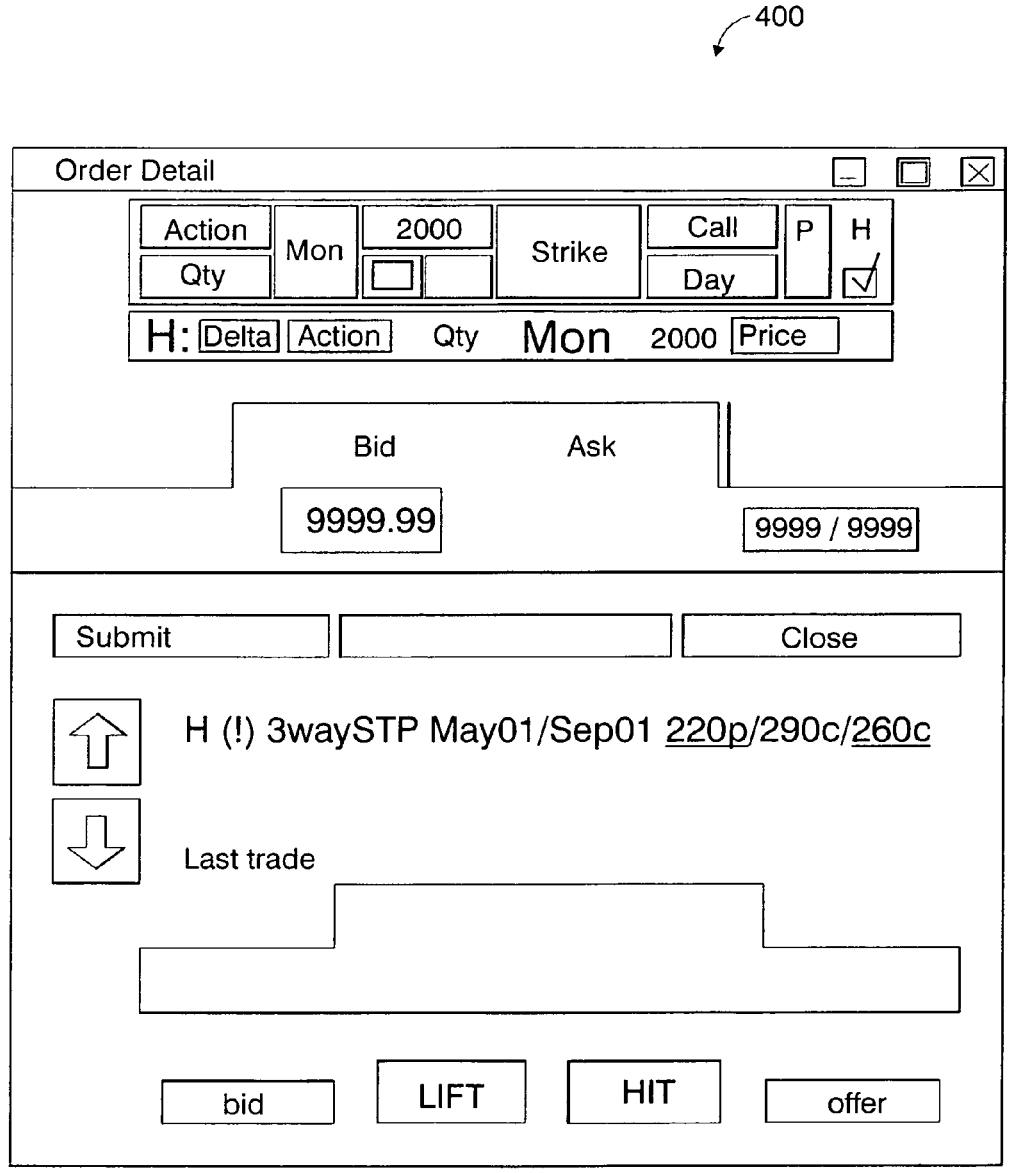
FIG. 4 illustrates a potential order entry dialog box that may be used in an embodiment of the trader client.

FIG. 3 illustrates a sample "trade" pull-down menu 300. The menu is multi-layered 302, 304 to further facilitate quick creation of contracts. It is preferable for these menu selections to be further supported by a dialog box tailored to the selected option type, such as provided via a new order entry card. For instance, the dialog box 400 illustrated in FIG. 4 would be populated (and/or modified) based on the pull-down menu selection.

In a preferred embodiment, system 100 supports trading of in excess of 100,000 different options types over the course of 240 months (a 20 year window from the current date) in various underlying markets. The number of options and available months, of course, is a matter of design choice. Regardless of the volume of information, human trader 50 may wish to focus on a segment of the market in determining upcoming trading strategy.

Figure 5:
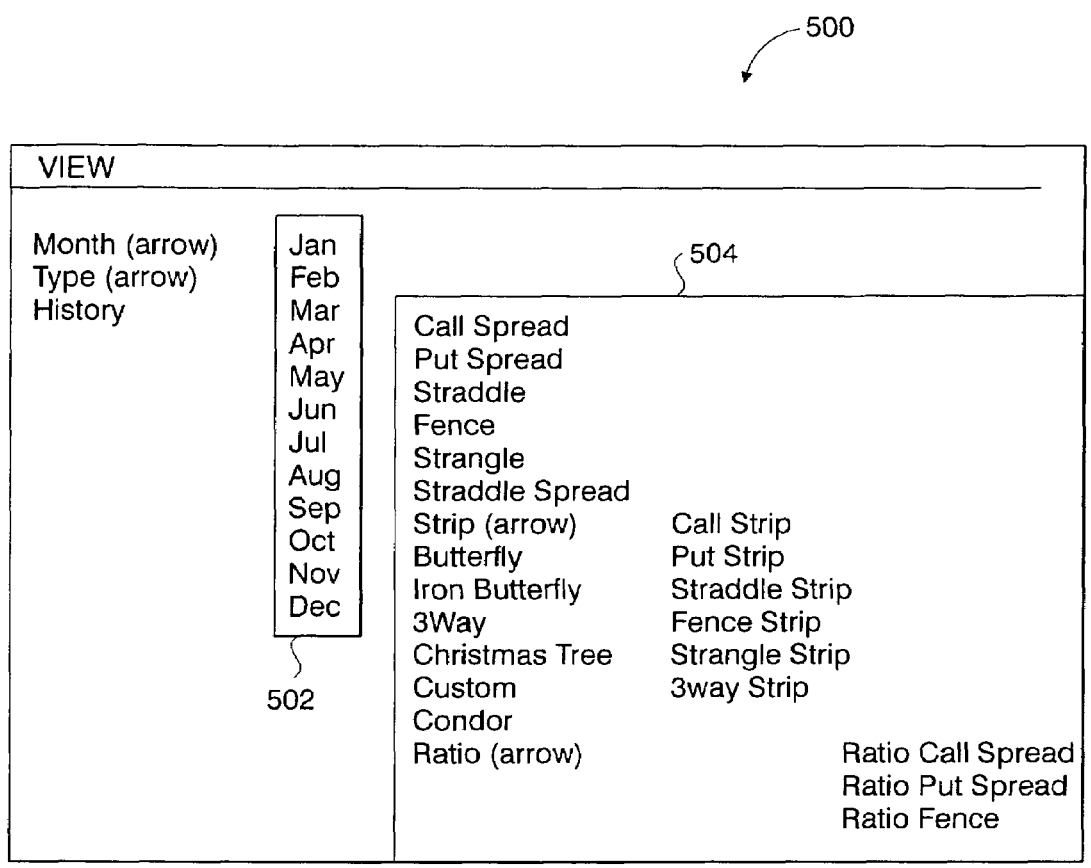
FIG. 5 illustrates a potential "view" pull-down menu, of an embodiment, that may be used in the main application screen of trader client.

FIG. 5 illustrates the "view" menu 500, which offers a mechanism for human trader 50 to review selected portions of trader 50's past trading history on the computer screen. For instance, in one approach to trader client 200, the "view" pull-down menu 500 facilitates quick selection of months 502 and contract types 504 using multi-layered pull-down menus.

Figure 7D:
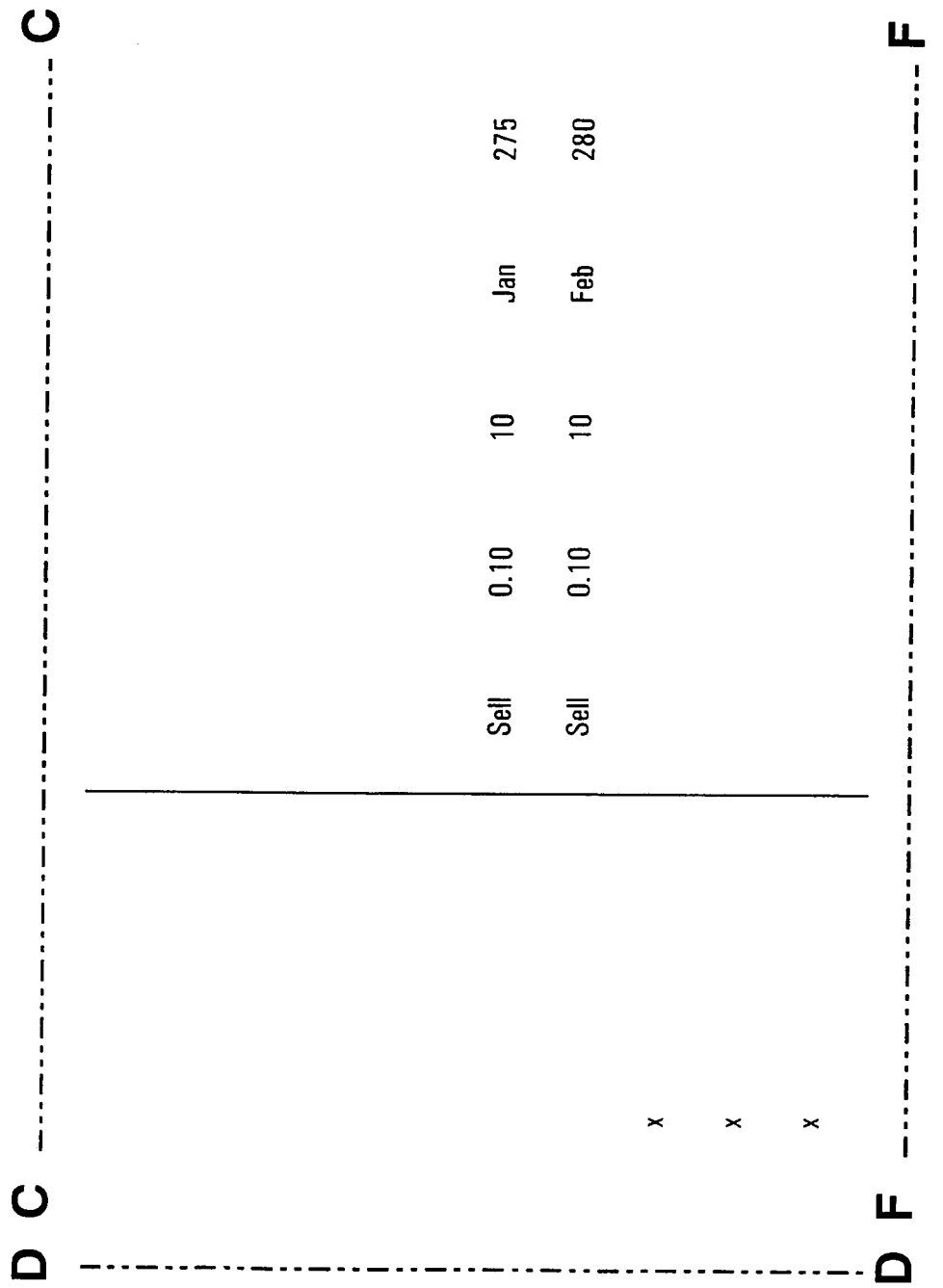
FIG. 7 illustrates a View Market Window of the trader client for an embodiment.
Figure 7F:
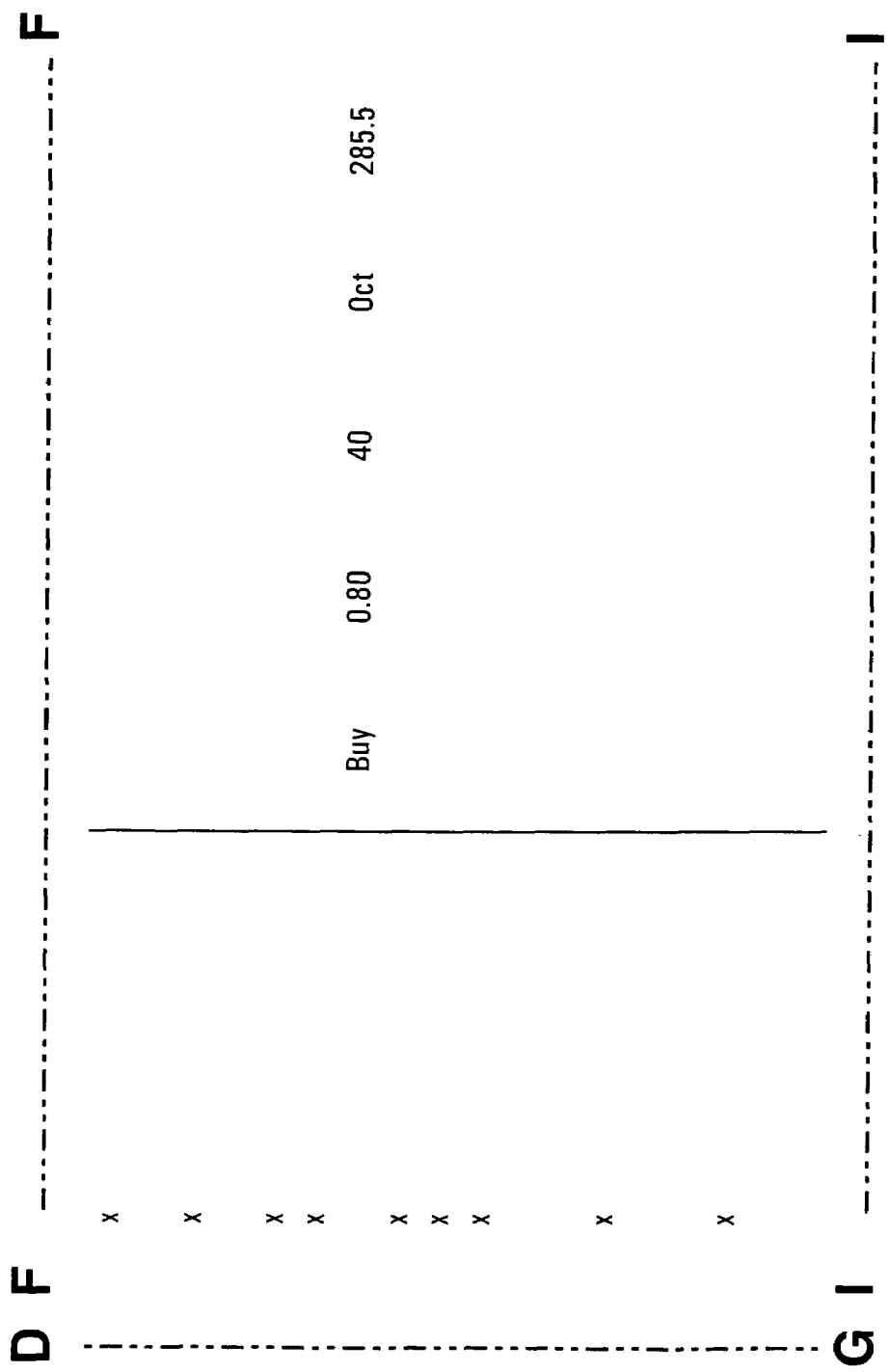
Figure 7H:
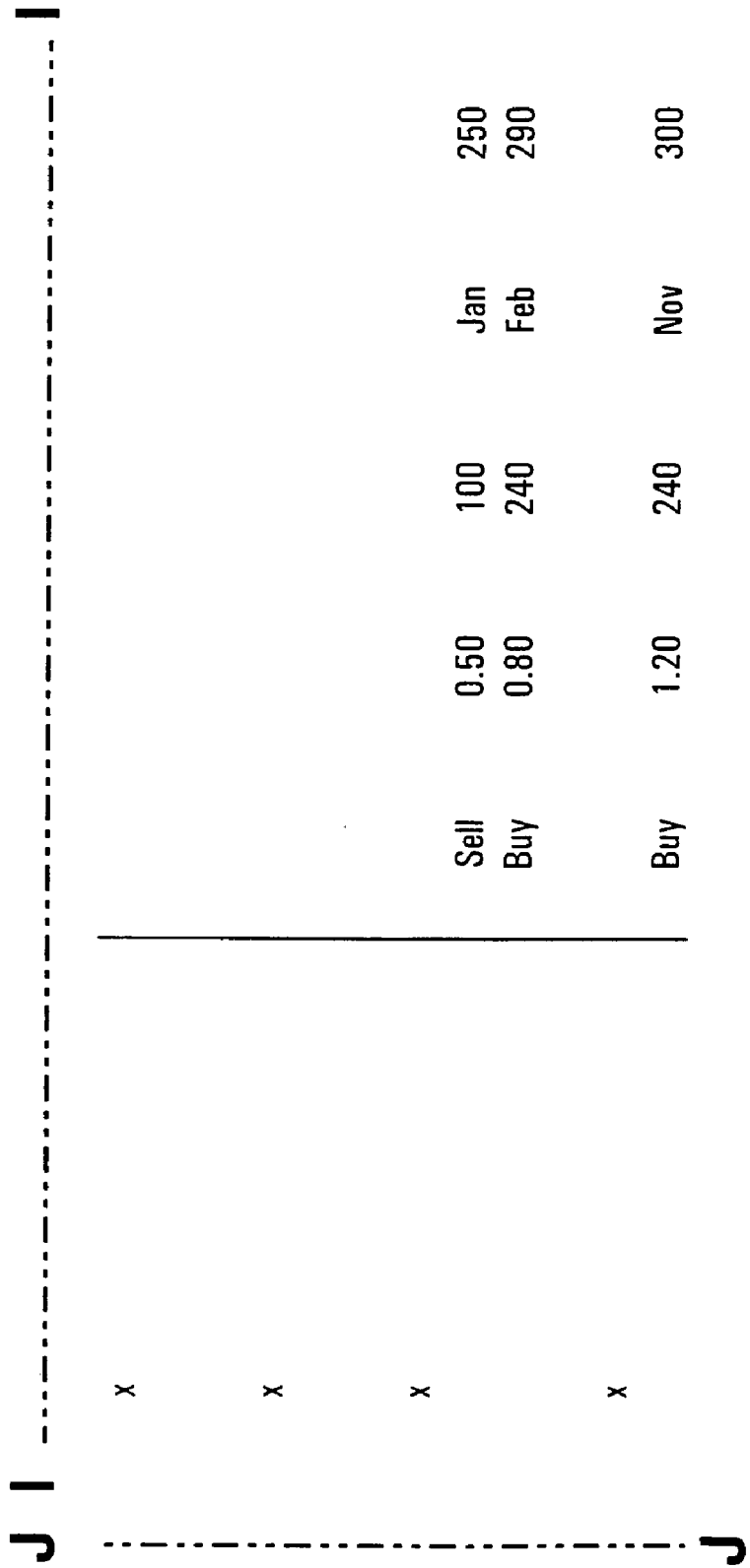

Alternatively, trader 50 may selected a particular trading date, which would result in the display all trades transacted by trader 50 on that date, as illustrated in FIG. 7. Other approaches to displaying and selecting alternatives from a list are well known to those in the graphical user interface art and may also be used to facilitate this functionality.

The main application window 220, illustrated in FIG. 2 further includes a "Time & Sales" menu 228 which displays the status of all the human traders in the current market. Thus, both "view" and "Time & Sales" menus display the same types of data, with an exemplary view window illustrated in FIG. 7. Similarly, the same type of multi-layered pull-down menus provided under the "view" menu 500 exemplified in FIG. 5 would likewise be provided for the "Time & Sales" menu 228. Of course, it would be understood to those in the art that other displays and means for filtering the displayed information may be used.

At the bottom of the main application screen 220 (FIG. 2) is a status bar 230. The status bar 230 is preferably divided into two sections. The first section is a message area that displays any relevant information for the user (e.g. "Submitting order to market server", "Order acknowledged by market server, Order number is ABCD123", "Order rejected by market server. Invalid option types 'XC'", "Order ABDC123 executed", "Submitting modify request to market server for order ABCD124 . . . ", and "Modify request received for order ABCD124.") The status bar message area may also retain a history of the messages it has displayed. As is known in the art, a button may be provided on the side of the message area that pops up a scrolling list of the previous messages in ascending chronological order.

The other side of the status bar 230 monitors the status of the connection of trader client 200 to market server 101. Under normal conditions, this area indicates "Connected," but may read "Reconnecting" or "Not connected."

Trader client 200 may also present trader 50 with a number of windows that enable tracking of open orders on the system and a history of activity for the day. Within these windows each instrument is displayed as a Consolidated Summary Line ("CSL"). A CSL representation is a valid expression in Quick Entry Language (QEL) that identifies at least the option type, best bid, size of best bid, best offer and size of the best offer for a particular instrument or contract (e.g. Call May 255). Double-clicking on any particular CSL brings up an Option Detail Screen 600 for the CSL's market, illustrated in FIG. 6. The initial state of the Option Detail Screen 600 is illustrated in terms of which of the Option Detail Screen's sub-windows are visible may be governed according to user preference.

Figure 6:
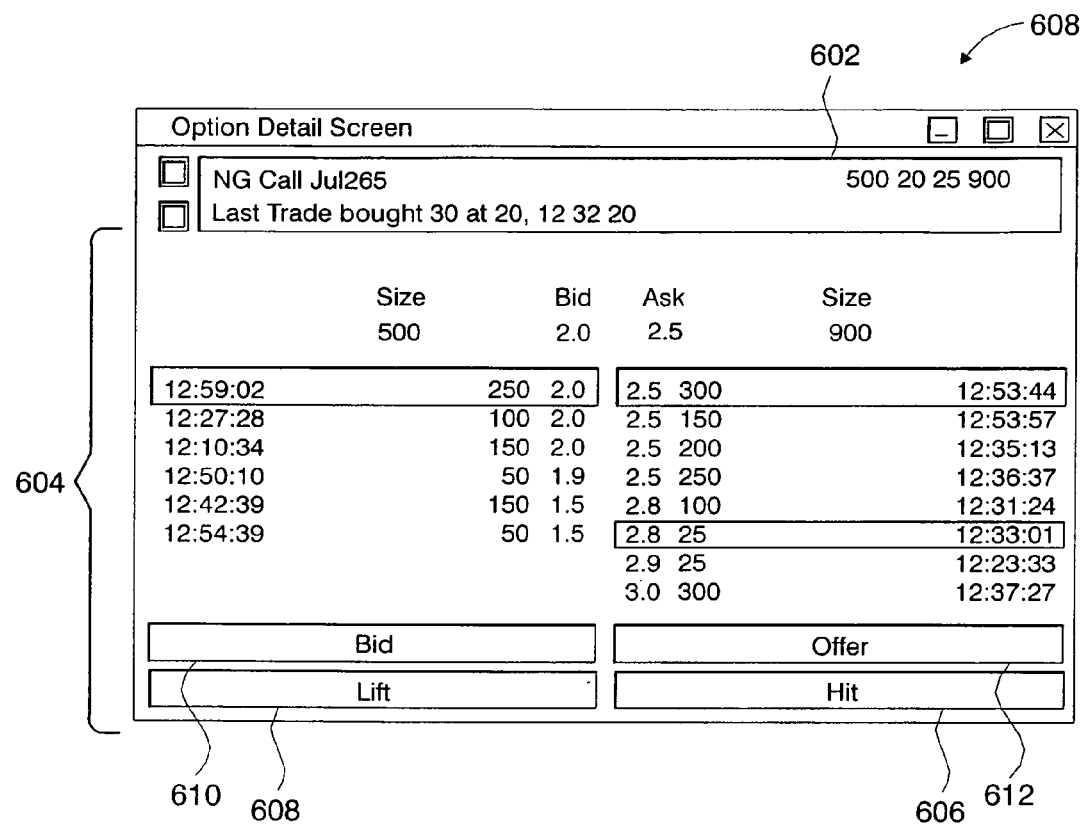
FIG. 6 illustrates an Option Detail Screen of the trader client for one potential embodiment.

As illustrated in FIG. 6, a full Option Detail Screen ("ODS") 600 has two components: Expanded Summary Line ("ESL") 602 and a Market Depth Montage ("MDM") 604. Whether both components of the ODS 600 are illustrated upon activation depend upon user preference. In one approach (not illustrated), two buttons, "Contract" and "Depth," could be physically associated with the ESL, where the "Contract" button toggles the visibility of an Order Entry dialog box and the "Depth" button toggles the visibility of a Market Depth Montage portion of the ODS 600.

The ESL 602 contains two lines. The first line has a contract summary line ("NG Call Jul 265") and bid/ask fields ("500 2.0 2.5 900"). The second line contains a record of the last trade, including the price, quantity, side, and timestamp for that contract. The Market Depth Montage 604 breaks out the display of contract type trades by showing a complete and detailed view of each quote and order related to the contract type represented by the ESL 602. As illustrated in FIG. 6, the first line of the MDM 604 has column labels. The second line shows a summary of the best bid and ask, and the quantities at those prices. Subsequent lines in the MDM 604 show ranked summaries of each quote or order active in the market, one quote or order per line, with the best bid and ask sharing the top line and each subsequent line becoming less preferred. Each line has two columns; the columns rank the bid and ask prices. Each column shows the timestamp of when the quote or order entered the market and the price and quantity of the order. Associated with the MDM 604 may be a series of buttons to facilitate Hit 606, Lift 608, Bid 610 and Offer 612 operations. The "Hit" button 606 is a one-click way to respond to the best bid. The "Lift" button 608 is a one-click way to respond to the best offer. As illustrated in FIG. 6, orders entered by trader client 200 will be highlighted in the MDM 600 (such as by the 3D boxes illustrated in lines 1 and 6 of the MDM 600 of FIG. 6). Similarly, if any of the orders in the MDM 600 were entered by a trader that does not meet the Right Counterparty Credit Rule, those orders will appear differently (perhaps "grayed out").

In the approach to trader client 200 illustrated in FIG. 2, in addition to the main application window, six more windows are illustrated: the Request for Quotes ("RFQ") window 232, the Order window 234, the most active window 236, potential order window 238, working order window 240 and filled order window 242. The RFQ 232, order 234 and most active windows 236 each show a scrolling display of CSL's that represent dynamically updated requests sent by the various traders using trader clients 200*a-n* in association with market server 101. The RFQ 232, order 234 and most active 236 windows start out empty at the beginning of each trading day and have vertical scrollbars that allow the user to scroll back from the current time to the beginning of the day. Orders in the potential order 238, working order 240 and filled order 242 windows may be sorted by option type, month, year, and strike price based on user preferences, real time selections and/or filtering.

The "most active" window 236 presents a CSL for each instrument that had activity (a new or updated order, quote, RFQ, or trade) within the previous sixty seconds. The rationale for this window is to provide a relatively stable display of current activity that does not scroll too fast for traders to be able to select interesting markets when there is a lot of activity. Again, it is known in the art that the time limit can be increased and decreased by user preference.

The Potential Order Window (POW) 238 displays a list of order templates that human trader 50 may complete and submit to market server 101 and, thus, provides a way for a trader to save commonly used orders so that future submissions are quick to perform. The trader may select one or more lines from the Potential Order Window 236 for submission, deletion, or export to Microsoft© Excel© (or other third party programs). Selected orders may also be dragged and dropped to other windows in trader client 200 where such an operation is functionally meaningful. For instance, an order cannot be manually moved to the Filled Order Window.

The Working Order Window (WOW) 240 displays all orders placed by trader 50 that are open at the current time (including orders that are only partially filled) (completely filled orders are automatically moved to the filled orders window in real time). The orders are displayed using CSL in a table, which dynamically grows in size as orders are entered over the course of the day. The rows may also dynamically update as the orders change status (i.e. partially or complete filled). The trader may kill selected orders in the working order window, which would—in a preferred approach—bring up a dialog box to confirm the kill. Once confirmed, the "Kill" sends a request to market server 101 to kill the order. When the request is acknowledged, the order changes state from "Pending" to "Kill". When the Kill is completed, the order changes state to "Killed".

Figures 9A, 9B:
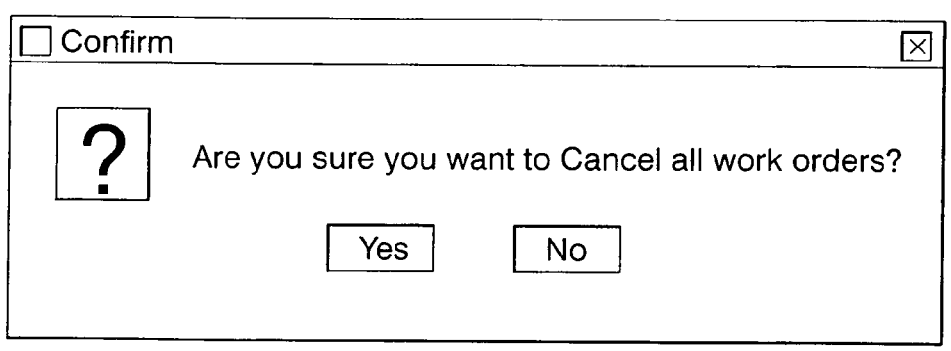
FIG. 9A illustrates a potential configuration of information windows in a graphical user interface of the trader client for one embodiment.
FIG. 9B illustrates a confirmation message dialog box associated with operation of the kill all orders feature of an embodiment of trade client.

FIG. 9A illustrates that the WOW 900 may further include a button that kills all of the orders placed by trader 50. This button, which may be referred to as a "panic button", may be useful to immediately withdraw trader 50 from all of his positions, if for instance, because of quickly changing market conditions (e.g. a declaration of war, a natural catastrophe, pipeline accident, etc.)

The trader may similarly seek to modify a selected order by bringing up a dialog box prompting the user to enter the modified order information. To assist the trader with the modification, the fields are preferably initially populated with the values of the original order. Only certain fields can be modified with the other order fields being displayed as read-only. Certain read-only fields can become editable when they become relevant in the current trade.

If any property of the order is modified other than a lifetime or downward quantity modification, then the order is not modified at its current place in its respective queue, but rather it is killed after a new order is submitted to the respective queue reflecting all the values input into the dialog box. Thus, the primary functional differences, from the user's perspective, between a modified order and a kill/submit sequence is that a newly submitted order has a new order ID and is entered at the bottom of the order queue, while a modified order retains its ID and position in the order queue.

The Filled Order window 242, illustrated in FIG. 2, lists all orders that have been executed during the current day, which dynamically grows in size as orders are executed or filled over the course of the day. The order tables may also provide the ability to expand or collapse the display of information supporting a displayed trade (i.e. displayed if multiple trades were executed to fill or partially fill this order).

FIG. 7 depicts exemplary information that would be displayed in, a view market window. The entries in this window may be sorted and filtered according to various criteria selected by the trader 50 using various techniques, such as the multi-layered pull-down menus illustrated in FIG. 3. Similarly, a history view window can be generated depicting trade history of one particular trader filtered for a particular date (i.e. 1/1/00), including all the relevant information regarding the trade. The trades illustrated in the history view can be selected and dragged into other windows, where functionally logical, toward placing a similar order in the active market.

In general, a new row is added to the bottom of a window each time an update is received by trader client 200 from market server 101, unless an instrument's CSL is already in the visible portion of the window, in which case the CSL updates in place within the window. For each window, detailed information (ODS 600, OEC, ESL 602 and MDMs 604) may be viewed for each trade, as well as summary-only information. A view of the orders can also be sorted or filtered based on various parameters including option type, hedging information (expiration date, strike price, ask price, bid price). The view may also show summaries for all markets, or be filtered to show only markets where the trader has orders, or only markets where the user has orders at the money. The times displayed in these windows are relative to the time zone of market server 101. Orders displayed in these windows may be dragged and dropped into other windows where such transfer makes functional sense.

Orders in a "potential order" window do not change state, unlike orders sent to the market, which change state depending on what happens to them in the market (e.g. acknowledged, partially filled, lied, killed, etc.). Trader 50 can select and send individual or multiple orders from the Potential Order window to market server 101 for execution. Multi-order submissions are only a shortcut for the user. System 100 actually submits each order individually to market server 101, which maintains no connection between simultaneously submitted orders.

A trader may enter orders, modify any of his working quotes or orders and execute a kill function. Orders, quotes and RFQs can be manually entered on an order entry card, a Quick Entry Language Line, by dragging and dropping a consolidated summary line ("CSL") into the "working order" window or "potential order" window, by "hit" or "lift" operations or imported from Excel spreadsheet by a drag-and-drop mechanism. (Conversely, orders can also be dragged from the Potential, Working or Filled Order Windows and dropped into an Excel spreadsheet). The following data is generally common to all RFQ, quotes and orders (bid/ask price and quantity fields not required for RFQ):

| | |
|---|---|
| Contract Type | The type of option to be traded, usually an underlying commodity type such as crude oil or natural as. |
| Side | Buying or selling |
| Quantity | the number of contracts of this type to which this order or quote refers |
| Expiration Date | For exchange-traded look-alike contracts, this will be an alphanumeric code for the month field, and a choice of numeric year values from the current year through 19 years out.<br>(In one embodiment, the year defaults to the closest later date (i.e. if order entry occurs on Jan. 31, 2000, then a March contract defaults to 2000, while a January contract defaults to 2001).<br>For non-standard contracts, the user specifies the actual expiration day, month and ear. |
| Strike Price | The price at which the underlying contract will be delivered in the event an option is exercised. |
| Bid or Ask Price | The price at which someone is willing to buy the underlying; or<br>The price at which someone is willing to sell the underlying. |
| Premium | a Boolean field that indicates that this leg has the higher value; that is, this is the leg whose rice is traded upon |
| Hedge | A Boolean field that indicates whether to hedge the order with futures contracts for the underlying, with the following parameters:<br>Hedge Delta ("hedge ratio") - the quantity of hedges to buy, expressed as a percentage of the order quantity<br>Hedge Expiration Date - the expiration date of the hedges (defaults to expiration date of the quote or order).<br>Hedge Price<br>Hedge Quantity - a calculated field which is the result of multiplying the Order Quantity by the Hedge Delta. In some approaches this may be rounded to nearest whole number. In other approaches a fractional hedge quantity may occur or be entered. |
| Underlying Quantity | If changed from default Quantity (Lot Size) for the Underlying, the contract described by the Order becomes a non-standard contract. The number of the underlying represented by a quantity 1 option contract. (A non-standard contract size whose Quantity field equals 1 effectively makes the trade "All or Nothing.") |

-continued

| | |
|---|---|
| Settlement Type | If changed from the default settlement type for the Underlying, the contract described by the Order becomes a non-standard contract |
| Delivery Point | If changed from the default delivery point for the Underlying, the contract described by the Order becomes a non-standard contract |
| Order Type | Orders default to limit orders.<br>Stop limit X-As soon as the market trades at X or lower, submit order to the matching process at X. |
| Fill or Kill (FOK) | an order that times out after 30 seconds - similar to a quote except that it is one sided and lasts loner |
| One Cancels the Other (OCO) | If one order is filled (completely or partially), then the other is killed |
| Time Limit | The specified number of seconds (10 seconds is the default for a Quote), Days (1 day is the default for the Orders) or Good Till Cancelled (GTC). |

When a quote, order or market summary line is selected, the trader may double-click on that entry prompting trader client 200 to display an order entry card (FIG. 4) window automatically populated by trader client 200 with values calculated to optimally execute against the selected quote or order. The order entry window also provides means for the trade to hit the bid, lift the offer, change a bid price or quantity, change an ask price or quantity and/or save the order to the "potential order" window 238. Once one of the actions above is selected, the trader is then presented with a detailed display of the order to be submitted, which is reviewed and modified as desired and then the trader specifies the submit, replace, kill, or potential order actions.

Of these possible actions, only the replace action may need additional explanation. For example, if the order being responded to is the user's order, then the existing order's quantity is decremented by the quantity being submitted and a new order is placed for that quantity. If the decrement is unsuccessful, the replace operation is aborted, and a user is informed that nothing happened. If the decrement could only be partially performed, then that is counted as a successful decrement and the new order is submitted but with a quantity adjusted so that the sum of the decrement orders quantity and the new order's quantity does not exceed the quantity of the decremented order's quantity prior to replacement.

The main application screen contains a Quick Entry Language Line (QELL), into which commands written in Quick Entry Language (QEL) are typed. Some QEL sequences cause Order Entry Card (OEC) or New Order Entry (NOE) screens to be spawned. As illustrated in the version of trader client 200 depicted in FIG. 2, a Quick Entry Language ("QEL") Line appears immediately below the menu bar. In particular, the Quick Entry Line allows trader 50 to enter the information for an order using a basic notation to represent the order parameters. QEL represents a faster entry method to make experienced users of trader client 200 more productive.

The Quick Entry Language ("QEL") provides a keyboard-based quick-entry format for fast order creation by experienced users. QEL is provided as an alternative means of command entry in addition to the more user-friendly, mouse-based, click and type method. It is possible to express most of the actions relevant to RFQ, quote and order entry in a compact character-oriented format. In addition, some QEL commands offer the ability to manipulate or navigate other trader client 200 functions. This language is specified as follows:

[Underlying] Action Quantity Month[Year] Strike Option-type Price [VS Hedged Delta]; or Underlying Option-type Action Quantity Month[year] Strike Price Vs Hedged Delta.

Optional elements are specified in square brackets all other elements are required to completely specify an instrument. (However, incomplete QEL expressions are often used for specifying a View Market filter or partially completing an Order Entry Card.). A non-exclusive list of "actions" facilitated by system 100 are illustrated in FIG. 8.

Also illustrated in FIG. 8, QEL supports reordering of elements so long as there is no possibility of ambiguity in the reordering. QEL supports both net and per-leg hedge deltas. For example, a trader on Feb. 10, 2000 could enter the order express: "Buy 100 June 2000 75 Calls at 15" in these ways:

B 100 Jun00 75 C 15

100 Jun 75 CALL 15B

CALL B 100 Jun00 75

The order entry date needs to be specified for this example because QEL year defaults are relative to the date on which they are being interpreted. Standard expirations are always month or MonthYear. Non-standard expiration dates are entered and displayed as NSD: Month, Day, Year. Non-standard delivery points and settlement types are entered and displayed by modifying the underlying symbol with colon-separated symbols. For example, a Natural Gas contract delivered in Denver settled in cash might be NG:RKY:$$.

Human trader 50 can assign a name to any selected custom order for future reference. This new type name would be automatically recognized by QEL, appear on the Main Application Screen Contracts and Windows View Market sub-menus. However, since this assigned name is local to the trader who defined it, the name not recognized by the matching engine sub-system of market server 101, which would continue to treat the order as custom.

The following are examples of the QEL language:

| Example | Description |
| --- | --- |
| NG V Mar55 C | Shows the market on the natural gas march 55 call |
| NG B 100 Mar 55 C 230 | Buy 100 Mar 55 Call at 230 |
| NG S 100 Mar 55 C 230 | Sell 100 Mar 55 Call at 230 |
| NG Mar 55 C RFQ | Sends a request for quote on the March 55 call |

The user may enter a hot key sequence that performs a pre-defined action in trader client 200 application. In one approach, there are hot key sequences for the following actions: (Bid; Offer; Hit Bid; Hit Bid for X Quantity; Lift Offer; Lift Offer for Y Quantity; Kill Order, Kill All Orders—(enters them into Potential Order window)).

The Order Entry Card (such as that illustrated in FIG. 4) dialog box is an entry screen for the specification of orders, quotes and RFQs. Each of the standard contract types (e.g. call, put, butterfly) has its own OEC. As an example, it someone wished to execute a 50-60-70 call butterfly, the EOT would capture the whole pattern as a call "butterfly" and trade it as a unit, instead of by specific components. With the QEL language, one could simply type "cfly" 50-60-70 and the system would understand that it is a 50-60-70 call butterfly and a OEC would automatically pop open and complete it based on whatever you was previously entered. In addition, an OEC for custom contracts may be used to enter orders for option types that are not predefined to system 100. Among other information, the OEC should display the name of the contract type. If the contract is hedged or has a nonstandard delivery point or settlement type, then the word "Hedged" and the symbols representing the delivery point or settlement type, respectively should become part of the contract name display.

The OEC may contain one or more contract legs, which are graphical representations of puts, calls or futures. For instance, the legs of a contract that are being bought can be represented in one color with one graphical prompt and legs being sold could be represented in another color with another graphical prompt. If a leg does not (yet) represent a bid or offer (for example, the OEC is for an RFQ or is unspecified), then there would be no graphical prompt on the leg. The legs have a number of fields, which may be active, passive, or protected, including Underlying; B/S/R—Buy/SelURFQ; Quantity; Expiration a Month; Expiration Year; Strike Price; Put/Call; Day; Special (delivery points and settlement types); Hedge area (Delta, Date and Price). The OEC may also include bid and/or ask price fields, except in an OEC for an RFQ.

The bottom portion of the OEC may optionally contain a set of buttons relevant to the context from which the OEC was spawned. These can include view market, potential order, submit order, replace order and kill order. Some option types require the quantities of each leg to be in a particular ratio to the other legs and, thus, will have numbers representing the ratios visually associated with each leg.

An OEC that is intended to be used to enter a new order is called a New Order Entry screen (NOE). In a NOE, some fields will preferably be auto-filled with default values, which trader 50 can then manually change if desired. For example, all quotes may start with their quantity field's value set to 10. Some fields may also be filled in from the context that invoked the NOE.

In the event a hedging contract is entered into trader client, client 200 determines whether the hedge ultimately results in the buying or selling of hedge contracts. In the first event, a Buy Call is equated to Sell Hedge; Sell Call is equated to a Buy Hedge; Buy Put is equated to a Buy Hedge; and Sell Put is equated to a Sell Hedge. Where the hedge is multi-legged, the net delta is actually the traded order. For example, a Buy of 50 Call Butterflies with a 18/12/10 delta operates like this:

B 50 Mar01 50/55/60 CFLY 10D=

B 50 Mar01 50 C/Sell 9 hedge

S 100 MarO1 55 C/Buy 12 hedge

B 50 Mar01 55 C/Sell 5 hedge

Therefore, the Net Hedge=Sell 2, 2D. Thus, trader client 200 should enter the hedge for an entire multi-leg order as a net hedge directly as a single hedge on one leg of the Order, and need not specify separate hedges for each leg. This minimizes the number of unnecessary orders placed on the market server. In one approach, the system may allow users to either enter a delta and compute a whole or fractional hedge quantity or enter a hedge quantity and compute either a whole or fractional delta. This gives users the choice to trade with either the delta (see FIG. 10A for the OEC example) or the hedge quantity (see FIG. 10B for the OEC example) as the deciding factor in a trade. Preferably, a computed delta will be rounded to the second decimal place (really the fourth decimal place because delta is actually a percentage figure). There will be no need to round the hedge quantity once the delta is rounded because that rounding will ensure a rounded hedge quantity result.

When one executes an option trade, one uses a "delta" to determine what amount of the underlying contract one should buy or sell to offset the trade one did in the option in order for one to have less risk. As an example, suppose there is a June 250 call, with a 10 Delta and one is buying 100 of it. This means it is just a percentage (10%). So one would execute 10% of the underlying against the call. So if one buys 100 June 250 calls, one is going to hedge it by selling 10 June futures. Traditionally in the market, one would buy 100 June 250 calls in the options ring and will than turn around to the futures ring and sell 10 June futures. Traders often execute a "laid up"—that is that they execute it as a package, because they wish to "hedge" themselves and relieve themselves of this extra futures risk. In the present system, we could just click a Hedge button, which would open up Hedge Fields that are related to each of the months. Thus, since one is hedging with the underlying futures, if one executes a June 250 call and a June 300 call spread in the same month, one would only have to hedge it once because one is only hedging June futures. But if one did a calendar spread (lets say a June 250 and a July 300 call), than he is trading two different months and, one would have to hedge the June futures and the July futures separately. In the first example, they are in the same month, and one could just net out the hedge.

In the preferred example of a fractional hedge approach, the trade will only match if the delta matches, partial fills might have to be re-submitted as with alternate delta mixes in order to achieve the desired result. For Example:

Trader A: B 100 Mar 75 Calls w/27 Delta: hedge=27 futures

Trader B: S 34 Mar 75 Calls w/27 Delta: hedge=9.18 futures

These two can trade in one of two ways:
1) Fractional Hedge Method:
Trader B hits bid (allowing for fractional hedge).
a. Match: 34 Mar 75 Calls w/27 Delta: Hedge=9.18
b. Partial fill leaves Trader B with an outstanding order:
B 66 March 75 Calls w/27 Delta: hedge=17.82
2) Fractional Delta Method:
Trader B entered their order with an exact hedge of 9:
a. Trader A must first cancel their outstanding bid for 100
b. Trader A must hit Trader B's order
c. Match: 34 March 75 Calls w/26.47[1] Delta: Hedge=9
d. Trader A must re-enter their original order for the remaining 66

[1] The hedge is actually "26.4705882352941", however it is rounded to the 2nd decimal place. See "Additional Rules #3; Rounding the Delta".

So, under this approach and every trade can go in either direction. An equation that can be derived from the above is as follows: $D(Q)=H$ or $H/Q=D$ (where Q=Option Quantity; D=Delta; and H=Hedge Quantity).

In this approach, the fractional hedging contracts must enter the market server based on "like deltas" not "like hedges." This approach insures that trades match when the initial quantities, and thus the hedge quantities don't match. Once a trade matches the hedge quantities will be the same, however, initially the delta will be the determining factor.

These fractional instruments may lend to the provision of additional functionality in the market views. For instance, giving users the ability to see identical hedged options in the market with different deltas. (i.e.: View every Hedged March 2001 50 Call). In one approach, after trader 50 opens an OEC, ESL or MDM for a hedged option, they can hit a button, which opens a small filter window showing the same option, but hedged with other deltas on the system. This would allow the trader to participate in alternate trades where the deltas don't initially match their delta. Essentially, this may be implemented as a filter based on the QEL with the option quantity, delta, futures quantity, and buy/sell as wild cards. It would also be possible to add variables to this "filtered" view, such as show all hedged calls; show all hedged March 2001 50 calls, etc.).

Some instrument types require the specification of quantity ratios between contract legs. On input to the trader client 200, all ratio trades will adjust their ratio and quantities automatically according to the least common divisor between the ratio elements. For example, an order for 200 2×4 Call Spreads will be entered as 400 1×2 Call Spreads. This will reduce the proliferation of disjoint ratio markets and help to increase liquidity in market server 101.

Custom option types may be specified—these are any sequence of put, call and "look-alike" futures contract legs and hedges that do not match the sequence (and their inter-leg constraints) that compose the system-defined option types. Custom orders allow the specification of ratios between each of their constituent legs.

An RFQ is a message broadcast to all interested market participants for price and quantity quotations on a particular underlying commodity (i.e. crude oil). Generally, an RFQ is sent when there is no activity (outstanding quotes or orders) relating to an underlying, though it is also appropriate to send an RFQ when the activity is low. Once all the required fields of an RFQ have been specified by a trader, it may be sent to market server 101. If the market server accepts the RFQ, the RFQ appears in the RFQ display of all other trader clients logged into market server 101. In one approach to the present invention, as the RFQ is sent to market server 101, trader client 200 also generates a potential order for that RFQ that requires manual insertion of only bid/ask price and quantity fields to make it a valid order or quote which can then reside in the potential order window of the trader client.

When market server 101 sends a message to trader client 200, it is available for viewing by the trader in summary of detail forms. Traders may even scroll through all messages received in a particular session.

Trader 50 may specify and save various application preferences that affect the operation of that trader's trader client 200. System 100 automatically saves trader's preferences after the user changes their values. For instance, these changeable preferences may include: Time Zone; Quote Expiration Time; FOK Expiration Time; Default Quote Quantity; Default Limit Order Quantity; and windows illustrated when displaying Option Detail Screen.

Alerts are dialog boxes that pop up on a user's screen that the user must affirmatively close. The user can configure trader client preferences to indicate which alerts should be received (executions, rejections, kills and system status messages). All alert messages appear in the status bar, regardless of the user's preference settings.

Before executing a user's request to initiate a significant transaction or a state change, the system can be configured to ask the user whether to proceed. This is a precaution against user mistakes. The confirmation is in the form of a pop-up dialog. Often the pop-up dialog looks like an order entry screen. In some approaches, confirmation can be turned on or off as a user preference.

Trader client 200 may also provide an API for a user to send the details of a potential order prior to submission to a third party analytics package. The third party package can calculate a bid and ask price then can be inserted into the order details. The user may then review the results, and submit the order.

Administrator client 300 provides a computer interface for trading firm administration staff to manage traders and counterparties. Among other functions, administrator client 300 should manage traders, firms, underlyings and contract specifications, send and receive system messages, kill orders and reverse trades for traders and monitor the status of users and market server 101.

As an adjunct to the various monitoring capabilities, administrator client 300 can also log trades for later analysis. For instance, administrator client 300 may provide both current and historical information of trades and activity by firm-related traders. In one approach, the reports could be either viewed online or downloaded into a third party spread-sheet program, such as Microsoft© Excel©.

Server administrator 400 provides a computer interface for managing users, option types, underlying commodity types, and system monitoring.

In operation, trader 50 launches trader client 200 on the local computer and enters a user ID. Trader client 200 then retrieves a local list of instruments that trader 50 is authorized to view and/or trade. A list of allowable contract types is loaded into trader client 200 from market server 101 each time the trader client 200 starts up. This underlying list having been established and perhaps previously modified by market server 101 during a previous session, trader 50 selects an underlying commodity to view or trade during the present computer session and provides his password associated with the user ID. (The underlying or contract type is generally fixed for a session with all subsequent operations referring to that type.) The login request is then submitted to market server 101, which verifies the User ID, Password, and rights of trader 50 to trade in the selected underlying market. If trader 50 passes security measures, then market server 101 sets entitlements, retrieves the default user preferences, displays one or more application screens in a layout determined by the retrieved preferences. Market server 101 displays all pending messages for trader 50 received since the last log out.

Basic Path for Submitting A Working Order:
  Trader enters all required fields on the Order Entry Card.
  Trader client 200 validates the field values against the applicable Order Validation rules based on current knowledge.
  The user submits the quote or order to market server 101.
  Market server 101 authenticates and validates the submission against the order validation rules.
  The system acknowledges the quote or order to the user.
  The accepted quote or order is submitted to the Order Matching service.
  If matched, the order executes, and trade confirmation messages are sent to each trade's counterparty.
  Market server 101 then modifies the quote or order according to the trade activity.
  The market server 101 broadcasts the resulting status to all interested market participants.
  Quote or Order is Rejected by Validation Rule. If market server 101 does not successfully authenticate or validate the quote or order, market server 101 sends a rejection message to the submitting user.
  Market server 101 is then closed.

The concept of "negative pricing" raises particular problems when trying to move an options trading system from a trading floor to an EOT when, in trading certain option strategies (combinations) the price of the first leg that one is buying versus the prices of the leg one is selling in the combination could be a net value of zero or close to zero. A trader can use a negative bid or offer when he is quoting a trade whose opposite sides are approximately equal in value. This scenario can occur in the following trade types:

straddle spread, fence, calendar call spread, calendar put spread, calendar fence, ratio call spread, ratio put spread, ratio fence, 3way, fence strip.

As an example, if there is a May 400 call (c) and June 450 call (c) and someone is interested in trading in combination (this is known as a Calendar Call Spread and involves the simultaneous purchase of one of these options and sale of the other). Further assuming that the value of the May call is $50 and the value of the June call is $100. The value of the spread is therefore $50 (because you are buying one option and selling the other). If a trader wishes to make a $5 profit trading this spread, regardless of whether he intends to buy the June 450c or sell the May 400c (buy the spread) or sell the June 450c and buy the May 400c (sell the spread), he would make the following 2-sided quote:

May400c/June450c $45 bid $55 offer

Which means he wants to either, buy the June call and sell the May call and pay $45 to execute this trade (it's worth $50 so it's a good deal). Or sell the June call and buy the May call and receive $55 to execute this trade (it's still worth $50). Now suppose the May 400c is worth $99 and the June 450 Call is worth $100 (the spread is worth $1). If the same trader wanted to make a two-sided quote that would ensure a $5 profit regardless of whether he intends to buy or sell the spread he would enter the following bid and offer:

May400c/June450c $−4 bid $6 offer

Which means either he will buy the June call and sell the May call and receive $4 (he should have paid $1 for it, a $5 profit). Or he will sell the June call and buy the May call and receive $6 (spread is still worth only $1). It is important to recognize that the following two quotes are mirror images of each other and create the identical 2-sided market. The only difference is that the first quote uses the June call to describe the trade while the second uses the May call. May400c/June450c−4 Bid 6 Offer=May400c/June 450c−6 Bid 4 Offer, because this trade means either buy the May call sell the June call and receive $6 or sell the May call buy the June call and receive $4.

Theoretically it's possible for there to be a negative bid and negative offer on a particular option spread (−50 bid −40 offer). This would be an usual way for a trader to make a quote. Applicants have therefore established a rule that a trader can enter a 2-sided negative market, however, that order will be displayed as it's positive mirror image in the Marketplace window. For example, a trader may enter Jan200p/Feb300p−$15 bid−$5 offer. The marketplace would display Jan200p/Feb300p 5 bid 15 offer, again a mirror trade of the original trade.

To overcome the many hurdles of negative pricing in an electronically traded options system, we have created a series of rules that should preferably be followed.

Trader Workstation (Front End):
  Single negative bids (without offers) or offers (without bids) are not displayed.
  Double negatives are not displayed.
  In the event that there is a negative bid with a positive offer it is displayed in terms of the lower strike.
  All ESL's establish for themselves a rule of the premium strike it uses to express negatives and positives at the point it is opened. In other words, whatever the TW is displaying, according to the Rules 0 and 0, at the time the ESL is opened, that will establish the rule for how it will be displayed for as long as it is opened.
  MDM is an extension of the ESL; therefore the open ESL has already established the rule for the MDM.

OEC, when created from the ESL (by pressing: ^, Hit, Lift, bid, offer), will reflect the rules of the open ESL.

The rules of the OEC when created from scratch, will be established by the order the user enters at that moment.

Working Order Window (WOW)

The WOW rules are based on whatever the rules were entered for the original order, and those rules will last forever.

Market WOW rules are based on whatever the rules were entered for the original order and those rules will last forever.

Filled Order Window (FOW):

The FOW is always displayed in terms that would result in a positive buy or sale. No trades ever occur at a negative price. The instrument description associated with the execution must be displayed in such a way to make the trade price positive.

Market Place (Back End):

All orders are displayed in terms of the lower strike in the earliest month.

An implied bid or offer is an order for any SPREAD that is generated by the system to help execute a users trade. For example, if the user is trying to sell a September 50/60 Call Spread for a price of 10 (sell the 50 strike and buy the 60 strike). As soon as the order is entered in the system by the user, the system starts searching for any bids or offers currently in the system, for either one of the legs in that particular trade (in our example the September 50 or 60 call) to offset the trade against. If for example, the system finds a 55 bid for the September 50 call, the system would automatically generate a 65 bid for the September 60 calls. If some other user happens to sell the September 60 calls for 65 then the system would automatically sell the 50 calls to the user who is bidding 55. The system using implied bids and offers has now executed the call spread for the price of 10.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A method for electronically trading options contracts and underlying contracts, wherein trading orders for trading the options contracts and underlying contracts are placed on a market server by a plurality of trader clients, the plurality of trader clients communicating with the market server over a computer network, the method comprising the steps of:

receiving, at the market server, a first order transmitted from a first one of the plurality of trader clients by a first trader, the first order specifying a bid to buy a first number of the options contracts and specifying a first hedge delta, the first hedge delta specifying a bid to buy or sell a first number of the underlying contracts;

receiving, at the market server, a second order transmitted from a second one of the plurality of trader clients by a second trader, the second order specifying a bid to sell a second number of the options contracts and specifying a second hedge delta, the second hedge delta specifying a bid to sell or buy a second number of underlying contracts;

determining by the market server whether the first order and the second order are matched according to one or more predetermined conditions; and executing a the trade of options contracts and underlying contracts among the first and second traders by the market server when the first order and the second order are matched;

wherein one of the predetermined conditions requires that the first hedge delta is equal to the second hedge delta.

2. The method of claim 1, wherein the first hedge delta is a fractional number.

3. The method of claim 1, wherein the second hedge delta is a fractional number.

4. The method of claim 1, wherein the first number of underlying contracts is a fractional number.

5. The method of claim 1, wherein the second number of underlying contracts is a fractional number.

6. The method of claim 1, wherein:

the number of options contracts traded is equal to the lesser of the first number of options contracts and the second number of options contracts, and the number of underlying contracts traded is equal to the first number of underlying contracts if the first number of options contracts is less than the second number of options contracts, and is equal to the second number of underlying contracts if the second number of options contracts is less than the first number of options contracts.

7. The method of claim 1, wherein the matching step further comprises the step of: determining that the first order and the second order satisfy the fight price queuing rule.

8. A system for electronically trading options contracts and underlying contracts, wherein trading orders for trading the options contracts and underlying contracts are placed on a market server by a plurality of trader clients, the plurality of trader clients communicating with the market server over a computer network, the system, comprising:

a memory storage for storing machine-readable instructions; and a processor programmable to execute the machine-readable instructions retrieved from the memory storage for:

a) receiving a first order transmitted from a first one of the plurality of trader clients by a first trader, the first order specifying a bid to buy a first number of the options contracts and specifying a first hedge delta, the first hedge delta specifying a bid to buy or sell a first number of the underlying contracts; delta;

b) receiving a second order transmitted from a second one of the plurality of trader clients by a second trader, the second order specifying a bid to sell a second number of the options contracts and specifying a second hedge delta, the second hedge delta specifying a bid to sell or buy a second number of underlying contracts;

c) determining whether the first order and the second order are matched according to one or more predetermined conditions; and d) executing a the trade of options contracts and underlying contracts among the first and second traders by the market server when the first order and the second order are matched;

wherein one of the predetermined conditions requires that the first hedge delta is equal to the second hedge delta.

9. The system of claim 8, wherein the first hedge delta is a fractional number.

10. The system of claim 8, wherein the second hedge delta is a fractional number.

11. The system of claim 8, wherein the first number of underlying contracts is a fractional number.

12. The system of claim 8, wherein the second number of underlying contracts is a fractional number.

13. The system of claim 8, wherein the processor is programmable to execute the trade by:

determining that one of the first number of options contracts and the second number of options contracts is a lesser number of options contracts, trading a number of options contracts that is equal to the lesser number of options contracts, and trading a number of underlying contracts that is equal to the first number of underlying contracts if the first number of options contracts is less than the second number of options contracts, and is equal to the second number of underlying contracts if the second number of options contracts is less than the first number of options contracts.

14. The system of claim 8, wherein the processor is further programmable to execute the machine-readable instructions retrieved from the memory storage for matching the first order and the second order by determining that the first order and the third order satisfy the right price queuing rule.

* * * * *